(12) United States Patent
Robell et al.

(10) Patent No.: US 12,180,699 B2
(45) Date of Patent: Dec. 31, 2024

(54) MULTI-LAYERED BARRIER OF FIRE RETARDANT AND VAPOR/MOISTURE BARRIER PROTECTANT METHOD AND DEVICES

(71) Applicants: Glenn Robell, Peoria, AZ (US); Brad Glazier, Palm Desert, CA (US)

(72) Inventors: Glenn Robell, Peoria, AZ (US); Brad Glazier, Palm Desert, CA (US)

(*) Notice: Subject to any disclaimer, the term of this patent is extended or adjusted under 35 U.S.C. 154(b) by 0 days.

(21) Appl. No.: 18/652,917

(22) Filed: May 2, 2024

(65) Prior Publication Data

US 2024/0328150 A1    Oct. 3, 2024

Related U.S. Application Data

(63) Continuation of application No. 18/380,182, filed on Oct. 15, 2023, now Pat. No. 11,976,462.

(60) Provisional application No. 63/417,290, filed on Oct. 18, 2022.

(51) Int. Cl.
| | |
|---|---|
| *B32B 7/12* | (2006.01) |
| *B32B 15/12* | (2006.01) |
| *B32B 15/14* | (2006.01) |
| *B32B 15/20* | (2006.01) |
| *B32B 29/02* | (2006.01) |
| *E04B 1/76* | (2006.01) |

(52) U.S. Cl.
CPC ............ *E04B 1/7675* (2013.01); *B32B 7/12* (2013.01); *B32B 15/12* (2013.01); *B32B 15/14* (2013.01); *B32B 15/20* (2013.01); *B32B 29/02* (2013.01); *B32B 2250/03* (2013.01); *B32B 2262/101* (2013.01); *B32B 2307/3065* (2013.01); *B32B 2307/718* (2013.01); *B32B 2307/7376* (2023.05); *B32B 2419/00* (2013.01); *E04B 2001/7691* (2013.01)

(58) Field of Classification Search
CPC .......... E04B 1/7675; E04B 2002/7691; B32B 2307/3065; B32B 2307/718; B32B 307/7376; B32B 27/12; B32B 15/20; B32B 27/32; B32B 7/12; B32B 2262/101
See application file for complete search history.

(56) References Cited

U.S. PATENT DOCUMENTS

| | | | | |
|---|---|---|---|---|
| 3,934,066 | A * | 1/1976 | Murch .................. | E04B 1/94 442/221 |
| 6,716,520 | B2 * | 4/2004 | Cook, II ................ | B32B 15/18 428/317.1 |
| 7,056,575 | B2 * | 6/2006 | Aanestad ............... | F16L 59/029 428/458 |
| 10,570,612 | B2 * | 2/2020 | Groft ..................... | B32B 37/06 |

(Continued)

*Primary Examiner* — Basil S Katcheves
*Assistant Examiner* — Daniel J Kenny
(74) *Attorney, Agent, or Firm* — Edmond DeFrank

(57) ABSTRACT

The embodiments disclose an apparatus including a first layer including a metalized film, a second layer including a heat treated luminized fiberglass cloth, a heat resistance adhesive between the first layer and the second layer and configured to adhere the heat treated luminized fiberglass cloth to the metalized film, a third layer including intumescent paper configured to be adhered to a back side of the heat treated luminized fiberglass cloth with a polyurethane adhesive and wherein the adhered first, second, and third layers form a multi-layered fire resistant barrier laminate configured to be applied to building materials.

19 Claims, 24 Drawing Sheets

(56) References Cited

U.S. PATENT DOCUMENTS

2011/0088918 A1\* 4/2011 Gonzales ................ A62C 2/10
 428/102
2016/0016386 A1\* 1/2016 Ennis ..................... B32B 15/14
 428/426

\* cited by examiner

MULTI-LAYERED BARRIER OF FIRE RETARDANT AND VAPOR/MOISTURE BARRIER PROTECTANT METHOD AND DEVICES

CROSS-REFERENCE TO RELATED APPLICATIONS

This patent application is a continuation of U.S. patent application Ser. No. 18/380,182 entitled "MULTI-LAYERED BARRIER OF FIRE RETARDANT AND VAPOR/MOISTURE BARRIER PROTECTANT METHOD AND DEVICES" filed on Oct. 15, 2023 by Glenn Robell and based on U.S. Provisional Patent Application Ser. No. 63/417,290 filed Oct. 18, 2022, entitled "MULTI-LAYERED BARRIER OF FIRE RETARDANT AND VAPOR/MOISTURE BARRIER PROTECTANT METHOD AND DEVICES", by LUKE ANTHONY ROBELL, the U.S. Patent Application being incorporated herein by reference.

BACKGROUND

Many manufacturers of structural and non-structural panels are adding value by laminating a moisture and/or vapor barrier, or radiant-type barrier, to the surface of one side of the panel. These types of products save time and are intended to do away with the need to manually apply moisture wrap type product or radiant barrier over the structural or non-structural panel after it has been installed on a construction project. Companies have patented products to accomplish the moisture barrier application, while others have provided a more basic membrane to block vapors.

DETAILED DESCRIPTION OF THE INVENTION

Figure 1:
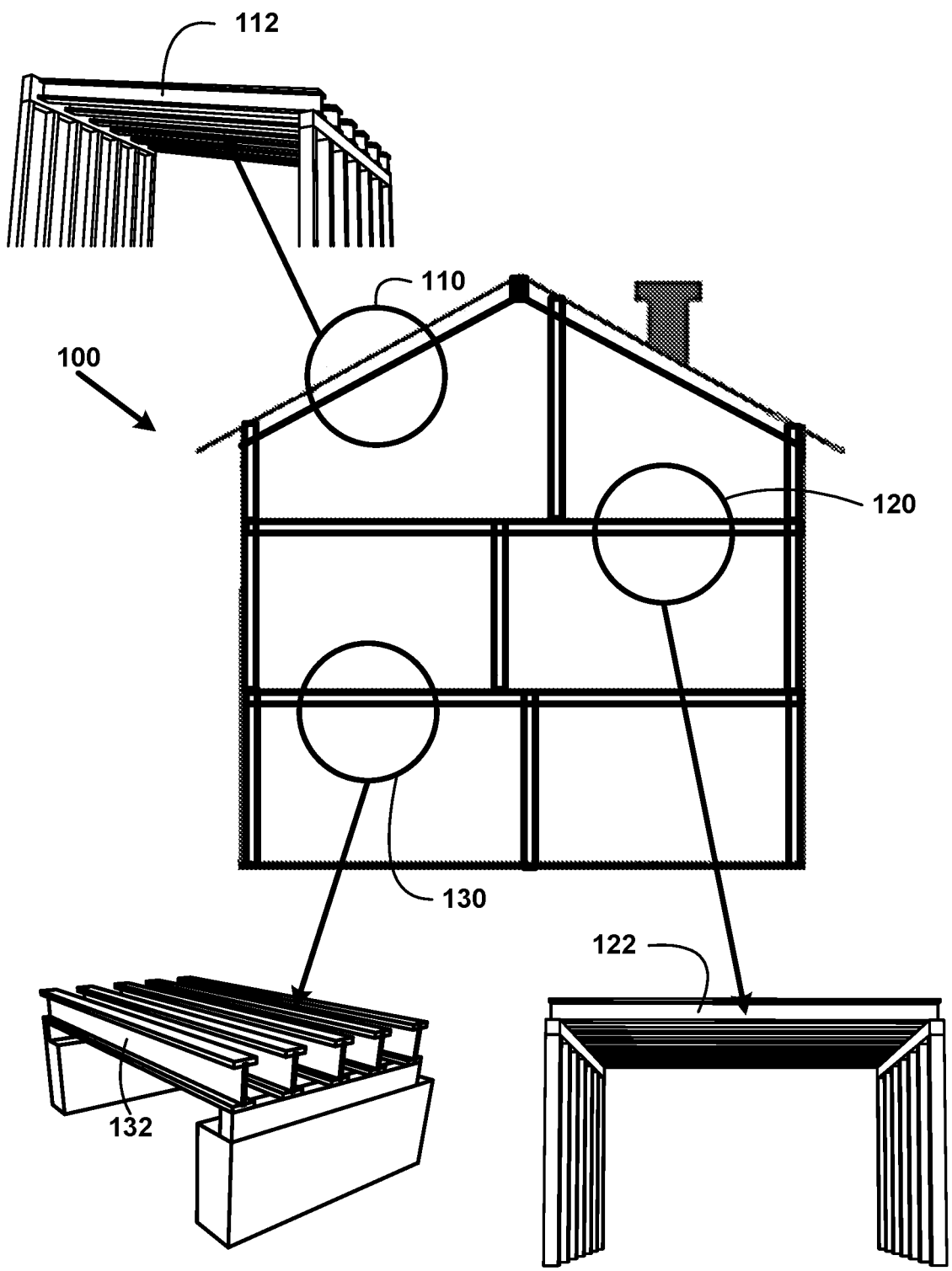
FIG. 1 shows for illustrative purposes only an example of a multi-layered barrier of fire retardant and vapor/moisture barrier protectant of one embodiment.

In a following description, reference is made to the accompanying drawings, which form a part hereof, and which are shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a multi-layered barrier of fire retardant and vapor/moisture barrier protectant method and devices described for illustrative purposes, and the underlying system can apply to any number and multiple types of intumescent paper. In one embodiment of the present invention, the multi-layered barrier of fire retardant and vapor/moisture barrier protectant method and devices can be configured using foil and silicon coated fiberglass or fiberglass using foil or silicon separately. The multi-layered barrier of fire retardant and vapor/moisture barrier protectant method and devices can be configured to include wireless digital sensors and can be configured to include digital electronics and communication devices using the present invention.

SUMMARY OF THE INVENTION

The primary objective of this invention is to provide a protective barrier when applied to engineered wood products (EWP) that will achieve adequate protection against fire and weather to successfully pass industry testing including but not limited to ASTM E119. It is contemplated for the present invention to be applied to engineered wood products (EWP) during the manufacturing process of a panel or I-joist and provide the required amount of protection against fire and extreme weather to meet local building codes.

The embodiments of the present invention include a protective barrier having a first layer including a metalized film, a second layer including a heat treated luminized fiberglass cloth, a heat resistance adhesive between the first layer and the second layer and configured to adhere the heat treated luminized fiberglass cloth to the metalized film, a third layer including intumescent paper configured to be adhered to a back side of the heat treated luminized fiberglass cloth with a polyurethane adhesive and wherein the adhered first, second, and third layers form a multi-layered fire resistant barrier laminate configured to be applied to building materials.

It is further contemplated that the present invention could be applied to engineered wood products after their manufacturing process in an offline system. The present invention in other embodiments can be used on other combustible substrates, for example, utility power poles and combustible infrastructure such as wood train bridges. Protection of power line infrastructure where the fire-resistant laminate resistant laminate can be field, or factory applied to wood or combustible power poles to protect during wildfires. Protection of combustible infrastructure such as wooden rails or road bridges where the fire-resistant laminate is applied around the combustible substrate to protect during wildfires. Today's construction projects and ever-changing building codes are demanding a higher level of fire protection than ever before. The present invention provides a system and method that is required to successfully pass industry testing (including but not limited to ASTM-E119 testing) required to meet applicable building code requirements. No invention is known to have all of the features and advantages of the present invention.

FIELD OF THE INVENTION

The invention herein relates to systems and methods used in the pre-manufacturing stage, during final inline manufacturing, or post-manufacturing in the field of engineered wood products (EWP), including but not limited to oriented strand board (OSB), plywood-type panels, and the production of I-joists, wherein a multi-layered barrier of fire retardants and vapor/moisture barrier protectant is applied onto engineered wood products to enhance their durability against fire and weather when applied to at least one surface.

Preferred but not required in all applications, it is contemplated that each layer of protection applied provides the proper amount of heat and fire protection necessary to pass all industry testing and not be just a decorative film-type laminate including but not limited to poly type liners and/or foam tapes with basically no added fire protection when compared to the system and method of the invention disclosed herein.

It is further contemplated that this multi-layered barrier can be in the form of a master roll-type product for easy production and manufacturing. A master roll product has a low thickness and low weight and does not significantly affect calculations of joists' thickness and weight. In one embodiment, the thickness is in a range of 0.8 millimeters to 2 millimeters thick and an average of 1.3 millimeters thick, is dry and no does not contain any wet chemicals. In one embodiment, the range of weight is about 650 grams/square meter and under 1,000 grams/square meter. In other embodiments, the range of thickness and weight is adjustable to fulfill the requirements of an application based on conditions and customer specifications.

In one embodiment, a master roll product may also be composed of, but not limited to, one or more of the following; fire retardant chemicals, plastics, rubbers, foils, papers, silicon-coated fiberglass, cloth, paper, metal, aluminum foil, and copper foil, plastic film materials including Polyvinylchloride (PVC), Polyethylene (PE), Polyurethane (PU), Polyethylene terephthalate (PET), Polypropylene (PP), and Thermoplastic Polyurethane (TPU) and equivalents. Thus the materials alone or in combination provide functions including decoration, waterproofing, flame resistance, and wear resistance.

The present invention includes a thermal barrier for assistance in passing industry fire testing, as well as a moisture and/or vapor barrier to protect both the engineered wood product and fire retardant barrier against extreme weather to assist in the passing of certain industry testing, including but not limited to ASTM-E119 testing. The present invention will withstand both fire testing and weather durability testing necessary for engineered wood products sold and used in current residential and commercial construction markets.

The present invention system and method incorporates the use of liquid and/or solid fire resistance and fire retardant chemicals, including but not limited to intumescent type chemicals in both liquid form or dry form, including but not limited to a pre-manufactured type intumescent paper in rolls or sheet-type product. These types of products become used as a part of the application process and are laminated and secured to an engineered wood panel product or I-joist providing enhanced fire protection as well as extreme weather conditions to withstand both fire and weather durability testing, including that identified in ASTM-E119, CAN/ULC S-101, ICC-ES AC14, ICC-ES AC264, NFPA 286, NFPA 275, CAN/ULC S-124, CAN/ULC S-145 and other national and international standards It is further contemplated that the multi-barrier system and method of the present invention will be laminated to the engineered wood panels or I-joist product. This lamination process will include but not be limited to the use of thermal adhesives or other types of chemical adhesion type methods. There is no other product or technology known that includes all the benefits and added value of the present invention, having the ability to successfully pass the required testing needed for building code approval while also allowing the present invention product to be sold and used in today's residential and commercial construction industries.

The present invention will significantly enhance today's engineered wood products (EWP) and assemblies by providing enough protection against fire and extreme weather conditions to pass required testing. Several companies have tried for several years and spent hundreds of thousands of dollars attempting to meet the harsh testing requirements necessary to manufacture a product equivalent to the present invention, incorporating both the fire-retardant properties in addition to the durability and protection against extreme weather. There is no other system and method known that has all of the benefits and advantages provided by the present invention.

The terms "multi-layered barrier of fire retardant and vapor/moisture barrier protectant" and "multi-layered barrier" as used interchangeably herein refer to the same product with no change in meaning.

General Overview:

FIG. 1 shows for illustrative purposes only an example of a multi-layered barrier of fire retardant and vapor/moisture barrier protectant of one embodiment. FIG. 1 shows a house 100. The roof of a house is built on rafters 110. One application of the multi-layered barrier of fire retardant and vapor/moisture barrier protectant is laminated barrier-wrapped I-joist rafters 112. They breach the ceiling 120 from a room to an attic space or from one story to the next story above. Laminated barrier-wrapped ceiling I-joist 122 is used to prevent or delay fire penetration of a ceiling. House flooring 130 can be burned by spreading the fire. Laminated barrier-wrapped flooring I-joist 132 is used to prevent or delay fire spreading through the floors of a house.

Fires in a building spread quickly and fast response from fire departments can make a difference in the extent of the damage. A laminated multi-layered barrier of fire retardant and vapor/moisture barrier protectant materials can reduce the spread of a fire providing additional time for an emergency response. A laminated multi-layered barrier of fire retardant and vapor/moisture barrier protectant materials are heat and flame-resistant.

Applications of the laminated multi-layered barrier of fire retardant and vapor/moisture barrier protectant materials are made to walls, ceilings, roofs, and flooring. The laminated multi-layered barrier of fire retardant and vapor/moisture barrier protectant materials delay the spread of a fire giving emergency crews time to arrive and put the fire out before engulfing the entire building. Fire protectant barriers are heat and flame-resistant.

Applications of the laminated multi-layered barrier of fire retardant and vapor/moisture barrier protectant materials are made to engineered wood products before construction. Pre-applications of the barriers to engineered wood products are made before construction to build fire protection from the ground up. The laminated multi-layered barrier of fire retardant and vapor/moisture barrier protectant materials delays the spread of a fire giving emergency crews time to arrive and put the fire out before engulfing the entire building of one embodiment.

DETAILED DESCRIPTION

Figure 2:
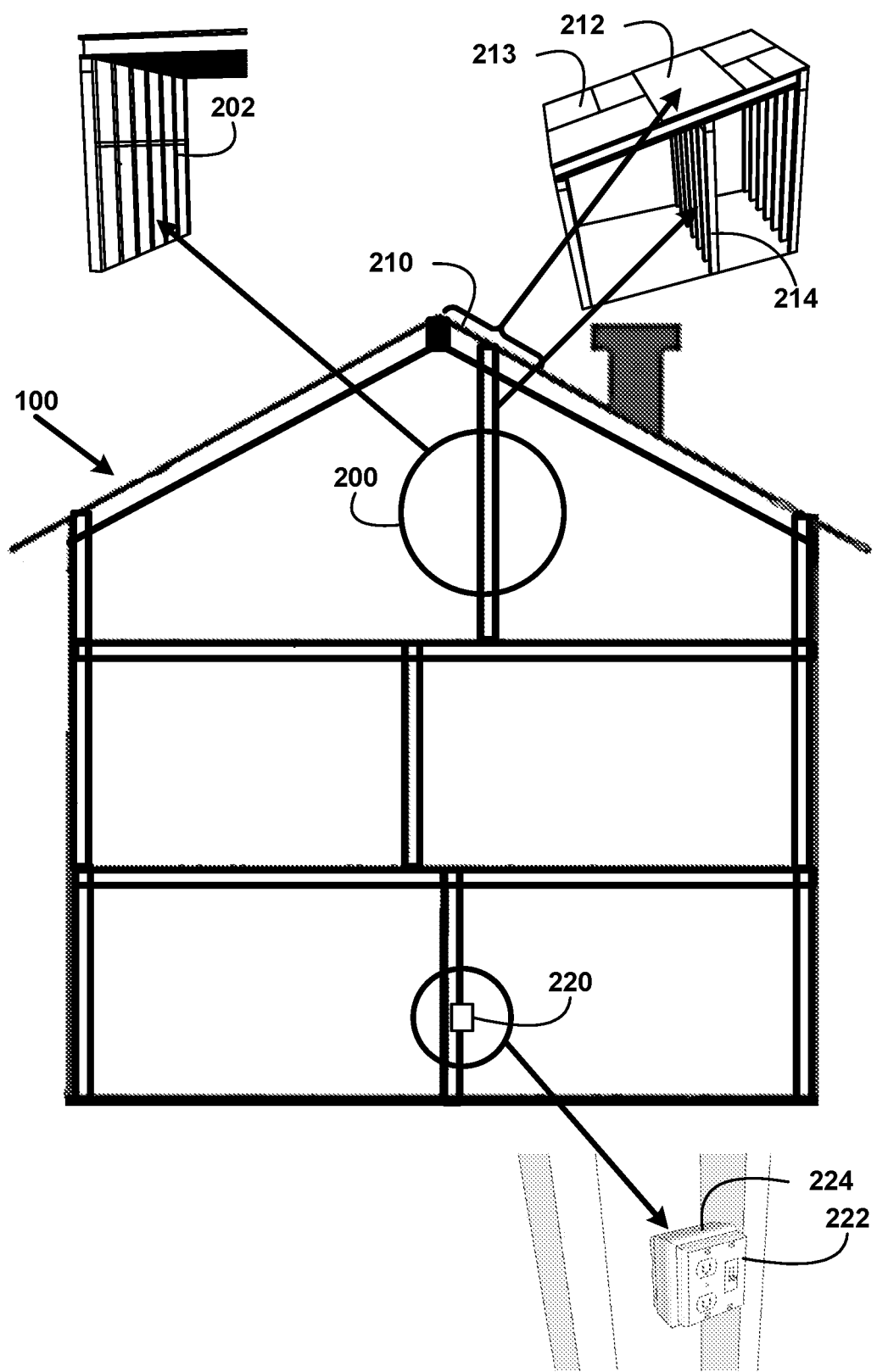
FIG. 2 shows for illustrative purposes only an example of applications of the laminated multi-layered barriers of one embodiment.

FIG. 2 shows for illustrative purposes only an example of applications of the laminated multi-layered barriers of one embodiment. FIG. 2 shows the house 100 where fires can spread quickly. The laminated multi-layered barriers are used over gypsum board 200 for example, a gypsum boarded wall 202. A roof barrier 210 application consists of the laminated multi-layered barrier 212 installed over the roof sheathing 213 above a load-bearing wall 214. Electrical fires generally start in an electric junction or outlet box mounted in a wall in which a short circuit takes place. An outlet 220 is attached to a wall stud and the outlet electrical box 222 is typically plastic and combustible. In one embodiment the barrier is formed of putty pads 224 adhered to the exterior of the electrical box to prevent burn-through of the plastic and spreading of a fire started in an electrical outlet.

Laminated multi-layered barriers delay fire from spreading through walls. Laminated multi-layered barriers delay fire from spreading through multiple-story floors. Laminated multi-layered barriers delay fire from spreading through the roof. Laminated multi-layered barriers are also applied to electrical devices to delay the spreading of electrical fires.

Laminated multi-layered barriers are also applied to air conditioning ducts to delay fires spreading into and out of the ducts. Laminated multi-layered barriers are also applied to electrical devices to delay electrical fires spreading. Applications of the laminated multi-layered barriers to engineered wood products can be performed on-site. Applications of the laminated multi-layered barriers to engineered wood products can be performed during the fabrication of the engineered wood products of one embodiment.

Figure 3:
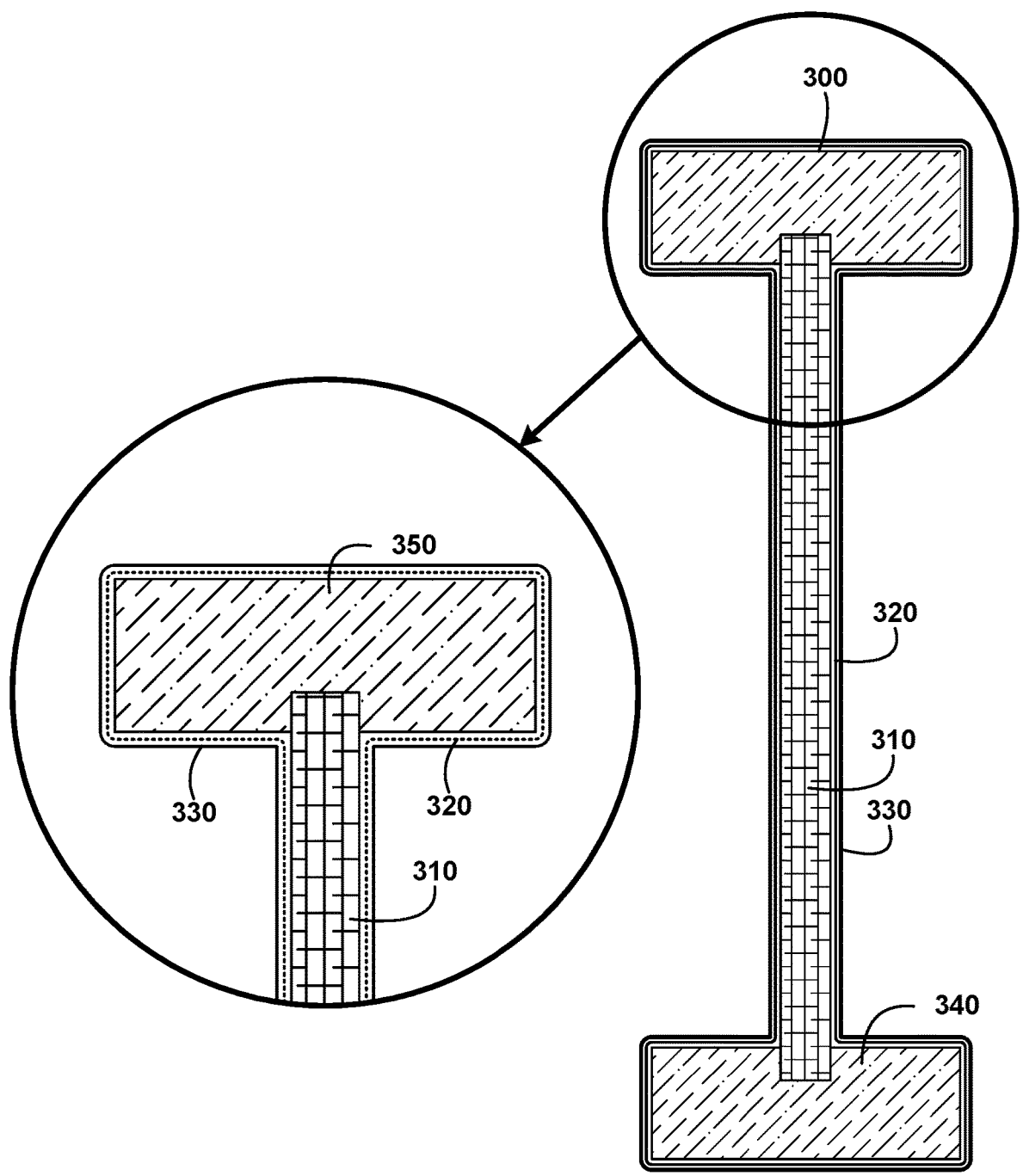
FIG. 3 shows for illustrative purposes only an example of laminated multi-layered barrier-wrapped engineered wood products of one embodiment.

Multi-Layered Barrier-Wrapped Engineered Wood Products:

FIG. 3 shows for illustrative purposes only an example of a laminated multi-layered barrier-wrapped engineered wood product of one embodiment. FIG. 3 shows an I-joist engineered wood product 300 including the web of the I-joist engineered wood product 310. The surfaces of the I-joist are prepared for wrapping the laminated multi-layered barrier with an adhesive applied to the I-joist 320. Applications of the laminated multi-layered barrier of fire retardant and vapor/moisture barrier protectant materials are adhered to the I-joist top flange, bottom flange, and both sides of the web to protect the entire I-joist. In one embodiment the web is fastened using staples instead of adhesive. The laminated multi-layered barrier is adhered to the surfaces of the I-joist 330. FIG. 3 shows a bottom flange of the I-joist engineered wood product 340. A detail shows the web of the I-joist engineered wood product 310, an adhesive applied to the I-joist 320, and the laminated multi-layered barrier adhered to the surfaces of the I-joist 330 including a top flange of the I-joist engineered wood product 350. In one embodiment, alternatively, the top surface can be a silicon-based material for the top surface instead of aluminum foil on the top surface. In another embodiment, the top surface is an aluminum film/foil or metalized film between 7-25 microns thick with service temperature resistance up to 550 Celsius of one embodiment.

Figure 4A:
FIG. 4A shows for illustrative purposes only an example of engineered wood product flooring of one embodiment.

Engineered Wood Products Flooring:

FIG. 4A shows for illustrative purposes only an example of engineered wood products flooring of one embodiment. FIG. 4A shows the I-joist engineered wood product used for engineered wood products flooring 400. Not shown is the laminated multi-layered barrier wrapping adhered to the I-joist engineered wood product. Applications of the laminated multi-layered barrier of fire retardant and vapor/moisture barrier protectant materials are adhered to the I-joist top flange, bottom flange, and both sides of the web to protect the entire I-joist. In one embodiment, alternatively, the top surface can be a silicon-based material for the top surface instead of aluminum foil on the top surface.

The wrapping of the I-joist engineered wood product used for flooring can be performed in the field without special tools. The wrapping of the I-joist engineered wood product used for flooring can be performed in the factory when the I-joist is being manufactured. In one embodiment, the laminated multi-layered barrier product can be field and/or factory-installed layers added to existing wood or pre-configured at the factory to wood with layered laminate of one embodiment.

Figure 4B:
FIG. 4B shows for illustrative purposes only an example of engineered wood products rafters of one embodiment.

Engineered Wood Products Engineered Wood Products Rafters:

FIG. 4B shows for illustrative purposes only an example of engineered wood products rafters of one embodiment. FIG. 4B shows engineered wood products rafters 410 installed on the roof ridge beam 420 to support the roof of a building. Not shown is the laminated multi-layered barrier wrapping adhered to the I-joist engineered wood product. The wrapping of the I-joist-engineered wood product used for rafters can be performed in the field without special tools. The wrapping of the I-joist engineered wood product used for rafters can be performed in the factory when the I-joist is being manufactured. The laminated multi-layered barrier wrapping does not affect the nailing and penetration of the nails and other connectors of one embodiment.

Figure 4C:
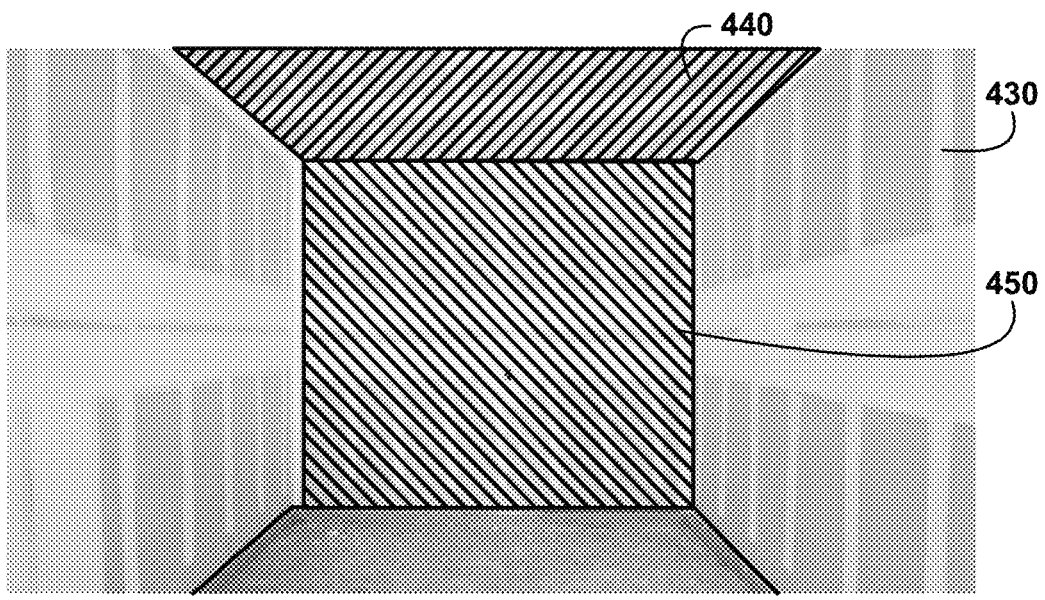
FIG. 4C shows for illustrative purposes only an example of applications of the laminated multi-layered barriers over the gypsum wallboard of one embodiment.

Applications of the Laminated Multi-Layered Barriers Over Gypsum Wallboard:

FIG. 4C shows for illustrative purposes only an example of applications of the laminated multi-layered barriers over the gypsum wallboard of one embodiment. FIG. 4C shows gypsum wallboard installed on walls and ceiling 430. The laminated multi-layered barriers applied over gypsum wallboard ceiling surface 440 reduce the opportunity of fire penetrating the ceiling to areas above the ceiling, for example, bedrooms or attic space.

The laminated multi-layered barriers applied over gypsum wallboard wall surfaces 450 reduce the opportunity of fire penetrating the walls and spreading to adjacent rooms and spaces. The laminated multi-layered barriers applied over the gypsum wallboard are performed by applying an adhesive on the gypsum wallboard and applying the laminated multi-layered barrier to the adhesive of one embodiment.

Figure 5A:
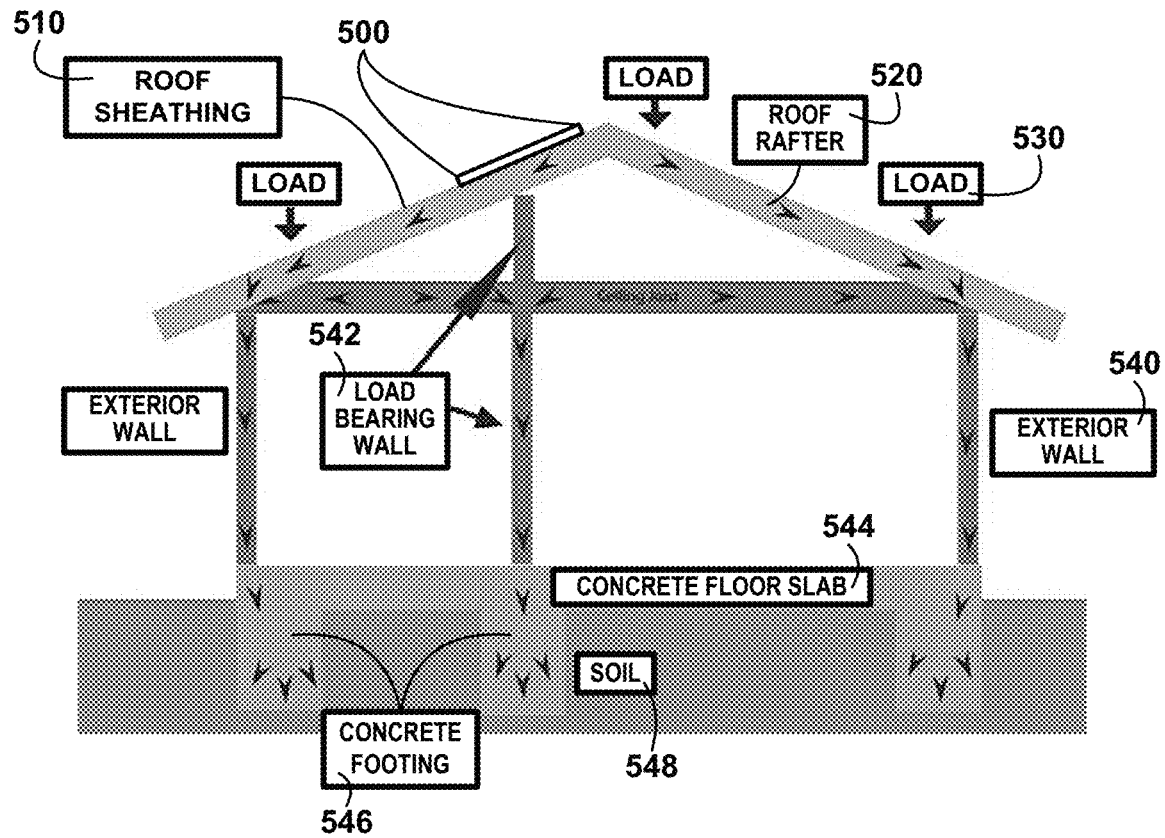
FIG. 5A shows for illustrative purposes only an example of applications of the laminated multi-layered barriers on roof sheathing over load-bearing walls of one embodiment.

Applications of the Laminated Multi-Layered Barriers on Roof Sheathing Over Load-Bearing Walls:

FIG. 5A shows for illustrative purposes only an example of applications of the laminated multi-layered barriers on roof sheathing over load-bearing walls of one embodiment. FIG. 5A shows laminated multi-layered barriers applied on roof sheathing over load-bearing walls 500. Roof sheathing 510 is commonly a plywood or OSB connected to the roof rafters and the roofing materials are attached to the roof sheathing 510.

A roof rafter 520 carries a load (weight) of the roofing materials. The load 530 transfers to both an exterior wall 540 and load bearing wall 542 to the concrete floor slab 544. The load is supported with a concrete footing 546 poured in the soil 548. The interior load-bearing wall 542 is constructed from the footing to the roof rafters. This provides a path where the flames and fire can travel up to the roof. Applying the laminated multi-layered barriers to the surfaces of the interior load-bearing wall 542, ceiling, roof rafters, and roof sheathing over the interior load-bearing wall 542 reduces the opportunity of the fire denigrating the integrity of the interior load-bearing wall 542 causing the roof to collapse of one embodiment.

Figure 5B:
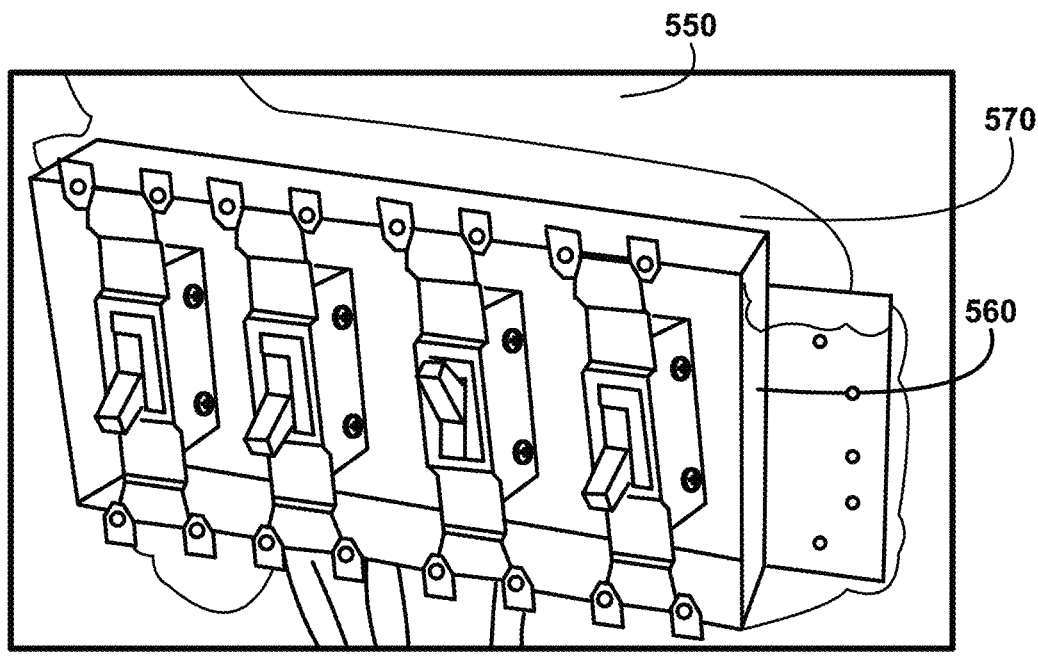
FIG. 5B shows for illustrative purposes only an example of applications of putty pad barriers around electrical boxes of one embodiment.

Applications of Putty Pad Barriers Around Electrical Boxes:

FIG. 5B shows for illustrative purposes only an example of applications of putty pad barriers around electrical boxes of one embodiment. FIG. 5B shows the back surface of gypsum wallboard 550 on the opposite side of the wall as the electrical connection box and for example a bank of switches 560. A thorough penetration has an opening that passes entirely through a fire-resistance-rated assembly, while a membrane penetration has an opening that only passes through one side of the assembly. Applications of putty pad barriers around electrical boxes 570 reduce the spread of an electrically-caused fire from spreading through the wall and traveling up the interior cavity of the wall of one embodiment.

Figure 6:
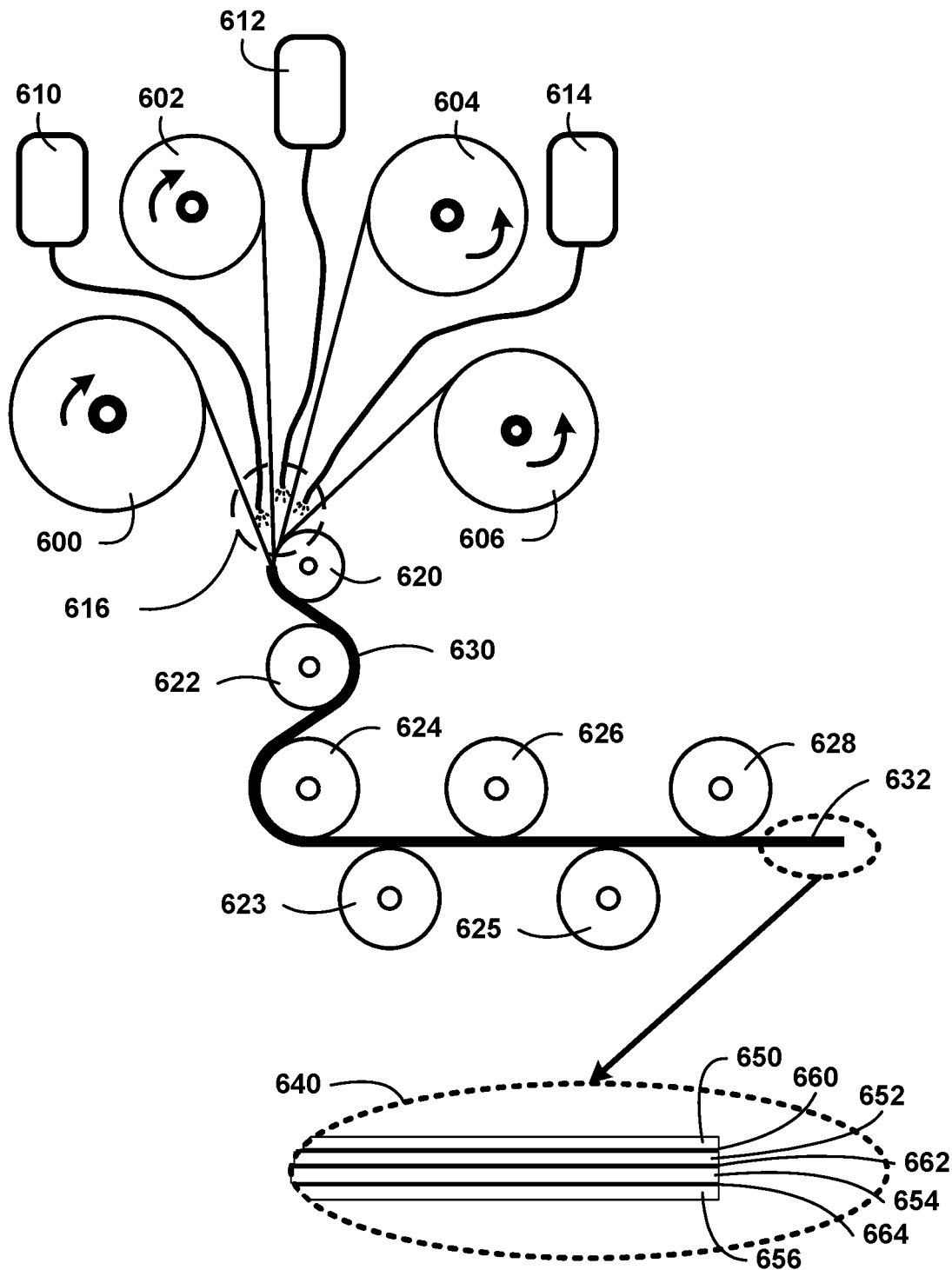
FIG. 6 shows for illustrative purposes only an example of a multi-layered barrier of fire retardant and vapor/moisture barrier protectant lamination manufacturing of one embodiment.

Multi-Layered Barrier of Fire Retardant and Vapor/Moisture Barrier Protectant Lamination Manufacturing:

FIG. 6 shows for illustrative purposes only an example of the multi-layered barrier of fire retardant and vapor/moisture barrier protectant lamination manufacturing of one embodiment. FIG. 6 shows the machine components of a multi-layered barrier of fire retardant and vapor/moisture barrier protectant lamination manufacturing operation. The laminates are mounted on rolls for feeding the materials into the other components. The laminates are supplied in rolls with specific dimensions for different applications. The non-rigid rolls provide a method to nest I-joists within the layered laminates.

The components include adhesive containers that feed the different adhesives through hosing to sprayers to apply the adhesive to laminate material surfaces. In one embodiment, the laminates include a first roll of aluminum foil 600, a roll of intumescent paper 602, a roll of silicon-coated fiberglass insulation 604, and a second roll of aluminum foil 606. Before the laminate materials join, an adhesive spray application is made between the laminate layers. An adhesive spray application between laminate layers 616 includes applications of a first adhesive 610, a second adhesive 612, and a third adhesive 614. In one embodiment, the top two surfaces are adhered/integrated with a heat resistance adhesive. In one embodiment, intumescent paper (IP) is adhered to the back side of the fiberglass with polyurethane adhesive. The IP is flexible and has a thickness of 0.45 mm. The IP is a non-woven fabric combined with intumescent compounds, with a weight of 350 grams per square meter and an expansion rate equal to or greater than 35 times by volume, is a dry layer and contains no liquid of one embodiment.

The laminates are joined together upon contact with a first laminating roller 620. The joined laminates are compressed, and the adhesive spreads uniformly across the laminate layers as they are pulled through a second laminating roller 622 and a third laminating roller 624 to compress the laminated layers 630. The laminated layers are further compressed by pulling the adhered layers through a first compression roller 623, second compression roller 626, third compression roller 625, and fourth compression roller 628.

The finished laminated multi-layered barrier before packaging 632 is shown in a detailed close-up. The laminated multi-layered barrier of fire retardant and vapor/moisture barrier protectant 640 structure includes the adhered layers of the first side aluminum foil 650, first adhesive 660, intumescent paper 652, second adhesive 662, silicon coated fiberglass insulation 654, third adhesive 664, and second side aluminum foil 656. The laminated materials are then packaged, for example, on a roll, precut sheets, or other customized applications packaging product of one embodiment.

Figure 7:
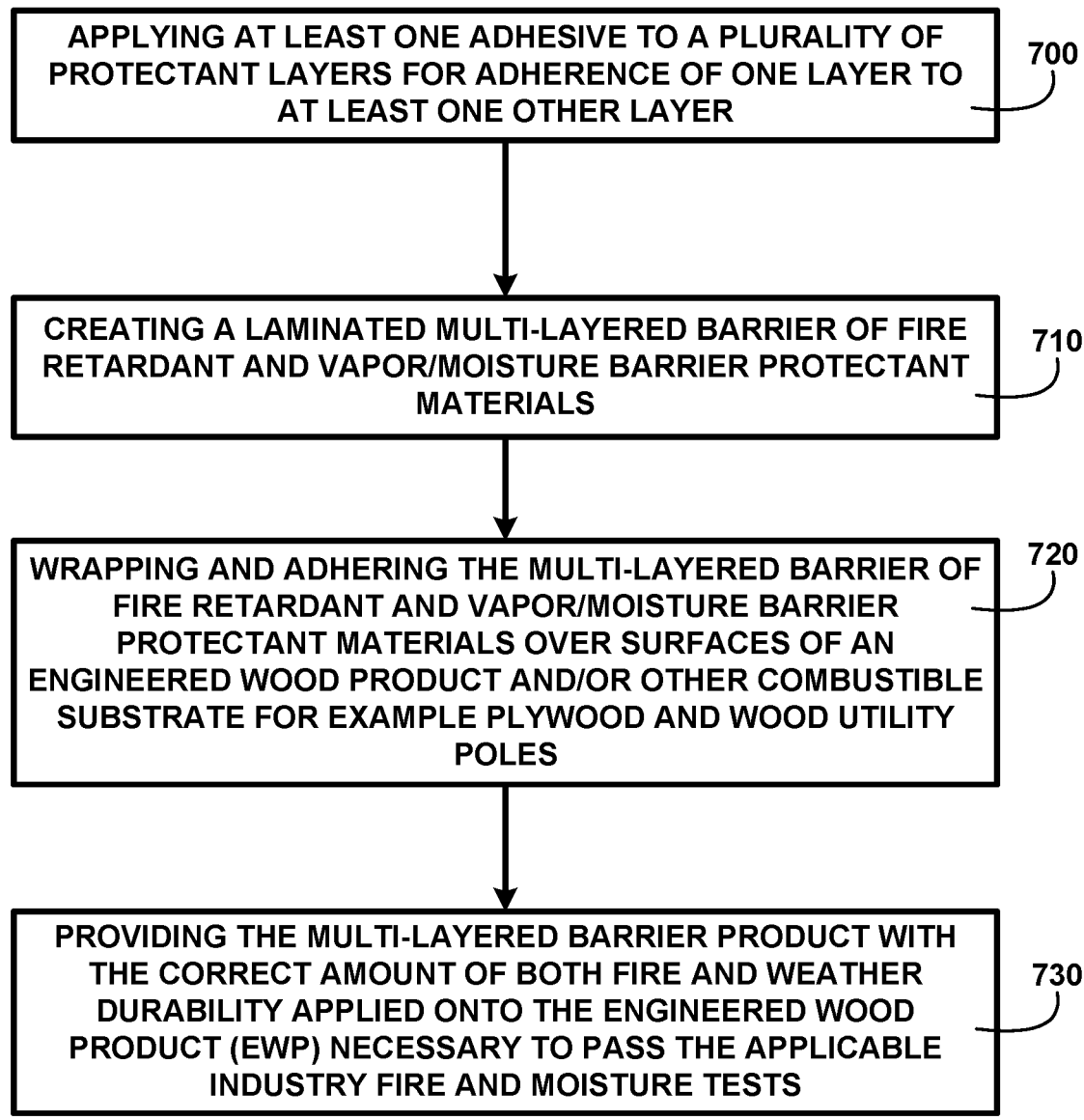
FIG. 7 shows a block diagram of an overview flow chart of a multi-layered barrier of fire retardant and vapor/moisture barrier protectant of one embodiment.

A Multi-Layered Barrier of Fire Retardant and Vapor/Moisture Barrier Protectant:

FIG. 7 shows a block diagram of an overview flow chart of a multi-layered barrier of fire retardant and vapor/moisture barrier protectant of one embodiment. FIG. 7 shows applying at least one adhesive to a plurality of protectant layers for adherence of one layer to at least one other layer 700. Creating a laminated multi-layered barrier of fire retardant and vapor/moisture barrier protectant materials 710. Wrapping and adhering the multi-layered barrier of fire retardant and vapor/moisture barrier protectant materials over surfaces of an engineered wood product and/or other combustible substrate for example plywood and wood utility poles 720.

Wherein engineered wood products and/or Composite type products include gypsum-based or Magnesium Oxide. Product laminate can be applied in-line or off-line during the time of manufacturing or can be installed at the job site. Providing the multi-layered barrier product with the correct amount of both fire and weather durability applied onto the engineered wood product (EWP) necessary to pass the applicable industry fire and moisture tests 730. The present invention is designed to withstand both fire testing and weather durability testing necessary for engineered wood products sold and used in current residential and commercial construction markets.

The present invention has the objective of acting both as a thermal barrier for assistance in passing industry fire testing, as well as a moisture and/or vapor barrier to protect both the engineered wood product and fire-retardant barrier against extreme weather to assist in the passing of certain industry testing, including but not limited to ASTM-E119 testing. In one embodiment, the multi-layered barrier is produced up to AC-14 standards. In another embodiment, the multi-layered barrier is produced up to ASTM D8391 standards. In yet another embodiment, the multi-layered barrier is produced to meet multiple standards of one embodiment.

DETAILED DESCRIPTION

Figure 8:
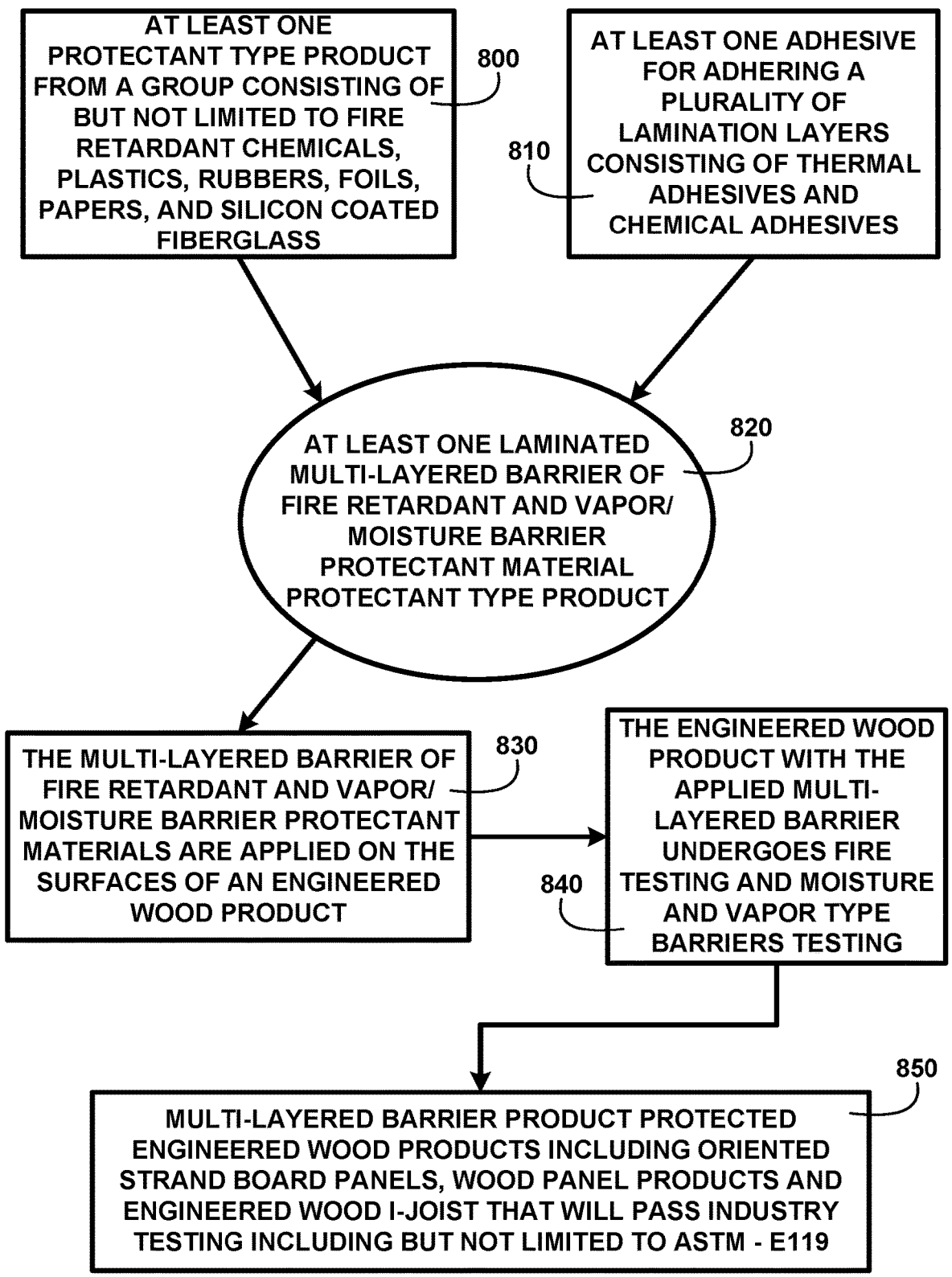
FIG. 8 shows a block diagram of an overview of a multi-layered barrier of fire retardant and vapor/moisture barrier protectant of one embodiment.

FIG. 8 shows a block diagram of an overview flow chart of a multi-layered barrier of fire retardant and vapor/moisture barrier protectant of one embodiment. FIG. 8 shows laminating at least one protectant type product from a group consisting of but not limited to fire retardant chemicals, plastics, rubbers, foils, papers, and silicon-coated fiberglass 800. Applying at least one adhesive to a plurality of lamination layers for adherence of one layer to at least one other layer with at least one adhesive from a group consisting of thermal adhesives and chemical adhesives 810. At least one laminated multi-layered barrier of fire retardant and vapor/moisture barrier protectant material protectant type product 820. Forming a multi-layered barrier of fire retardant and vapor/moisture barrier protectant materials.

In one embodiment, the multi-layered barrier includes a fiberglass cloth with silicon fibers and then intumescent paper—with an Aluminum foil final layer. In another embodiment, the fiberglass cloth is heat-treated aluminized fiberglass cloth having an 8/cm thread count in one direction and 5.7/cm thread count in cross weave other direction, and the weight is at least 610 gram/square meter, and the thickness is 0.75 mm of one embodiment.

Wrapping the multi-layered barrier of fire retardant and vapor/moisture barrier protectant materials over at least one surface of an engineered wood product 830. The engineered wood product with the applied multi-layered barrier undergoes fire testing and moisture and vapor type barrier testing 840. Testing of the engineered wood product with the applied multi-layered barrier of fire retardant and vapor/moisture barrier protectant materials including fire testing as well as moisture and vapor type barrier testing to protect both the engineered wood product and fire-retardant barrier against extreme weather. Passing certain industry testing including but not limited to ASTM-E119. Multi-layered barrier product protected engineered wood products including oriented strand board panels, wood panel products, and engineered wood I-joist that will pass industry testing including but not limited to ASTM-E119 850.

The invention herein relates to systems and methods used in the pre-manufacturing stage, or during final inline manufacturing, of engineered products (EWP), including but not limited to oriented strand board (OSB), plywood-type panels, and the production of I-joists, wherein a multi-layered barrier of fire retardants and vapor/moisture barrier protectant is applied onto engineered wood products to enhance their durability against fire and weather when applied to at least one surface. Product laminate can be applied in-line or off-line during the time of manufacturing or can be installed at the job site.

Preferred but not required in all applications, it is contemplated that each layer of protection applied provides the proper amount of heat and fire protection necessary to pass all industry testing and not be just a decorative film-type laminate including but not limited to poly type liners and/or foam tapes with basically no added fire protection when compared to the system and method of the invention disclosed herein of one embodiment.

Figure 9:
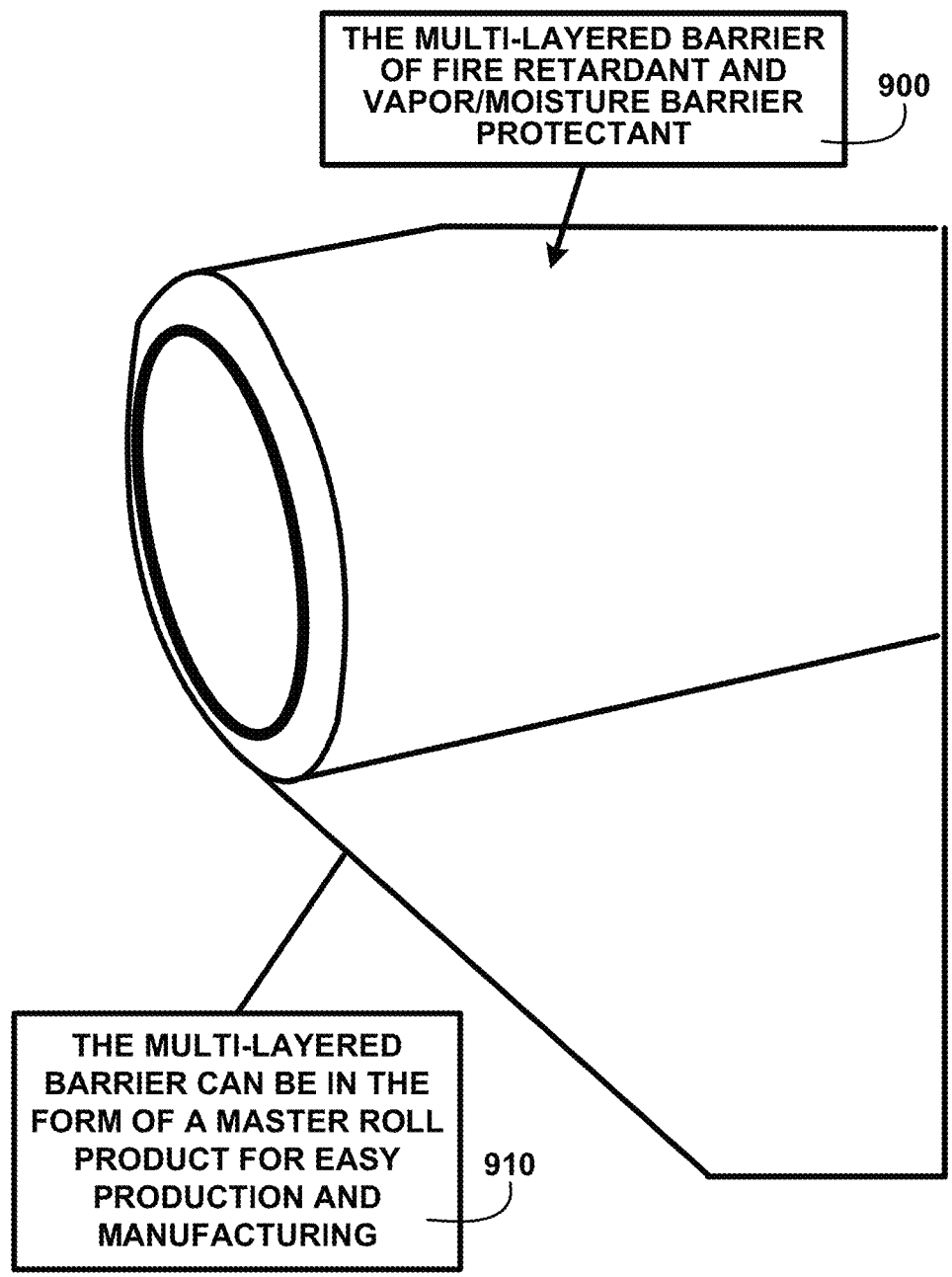
FIG. 9 shows for illustrative purposes only an example of a roll of the multi-layered barrier of fire retardant and vapor/moisture barrier protectant of one embodiment.

A Roll of Multi-Layered Barrier:

FIG. 9 shows for illustrative purposes only an example of a roll of the multi-layered barrier of fire retardant and vapor/moisture barrier protectant of one embodiment. FIG. 9 shows a roll of the multi-layered barrier of fire retardant and vapor/moisture barrier protectant 900 after lamination. The multi-layered barrier can be in the form of a master roll product for easy production and manufacturing 910. A master roll product has low thickness and low weight and does not significantly affect calculations of joists' thickness and weight 920.

In one embodiment, the thickness is in a range of 0.8 millimeters to 2 millimeters thick and an average of 1.3 millimeters thick, is dry and no does not contain any wet chemicals 930. In one embodiment, the range of weight is about 650 grams/square meter and under 1,000 grams/square meter 940. In another embodiment, the multi-layered barrier of fire retardant and vapor/moisture barrier protectant may be produced in the form of predetermined sheets sized for specific engineered wood product applications.

It is further contemplated that the thickness of the present invention laminates can vary in the application depending on the intended use of the structural or non-structural panel providing the end product with the correct amount of both fire and weather durability applied onto the engineered wood product (EWP) necessary to pass the applicable industry fire tests including but not limited to the ASTM E119-AC14 required for proper certification and industry use. Such certification will allow these new products with enhanced fire resistance properties in addition to the existing moisture and/or vapor radiant barrier weather durability to comply with local building codes and be widely used in today's residential and commercial building industry.

It is further contemplated that the thin moisture and/or vapor weather protectant and radiant barriers may optionally assist the initial reaction of the fire-stop chemicals used in the application once extreme heat and/or fire come in contact with the surface and may be wrapped over the edge of the panel and/or partially applied onto the other side of the panel and/or completely cover the opposite side of the panel to ensure additional protection. No invention is known to have all of the features and advantages of the present invention.

While the written description of the invention herein is intended to enable one of ordinary skill to make and use its best mode, it should also be appreciated that the invention disclosure only provides examples of specific embodiments and methods, and many variations, combinations, and equivalents also exist which are not specifically mentioned. The present invention should therefore not be considered as limited to the above-described embodiments, methods, and examples, but instead encompassing all embodiments and methods identified in the accompanying claims, and also within the scope and spirit of the invention.

Figure 10:
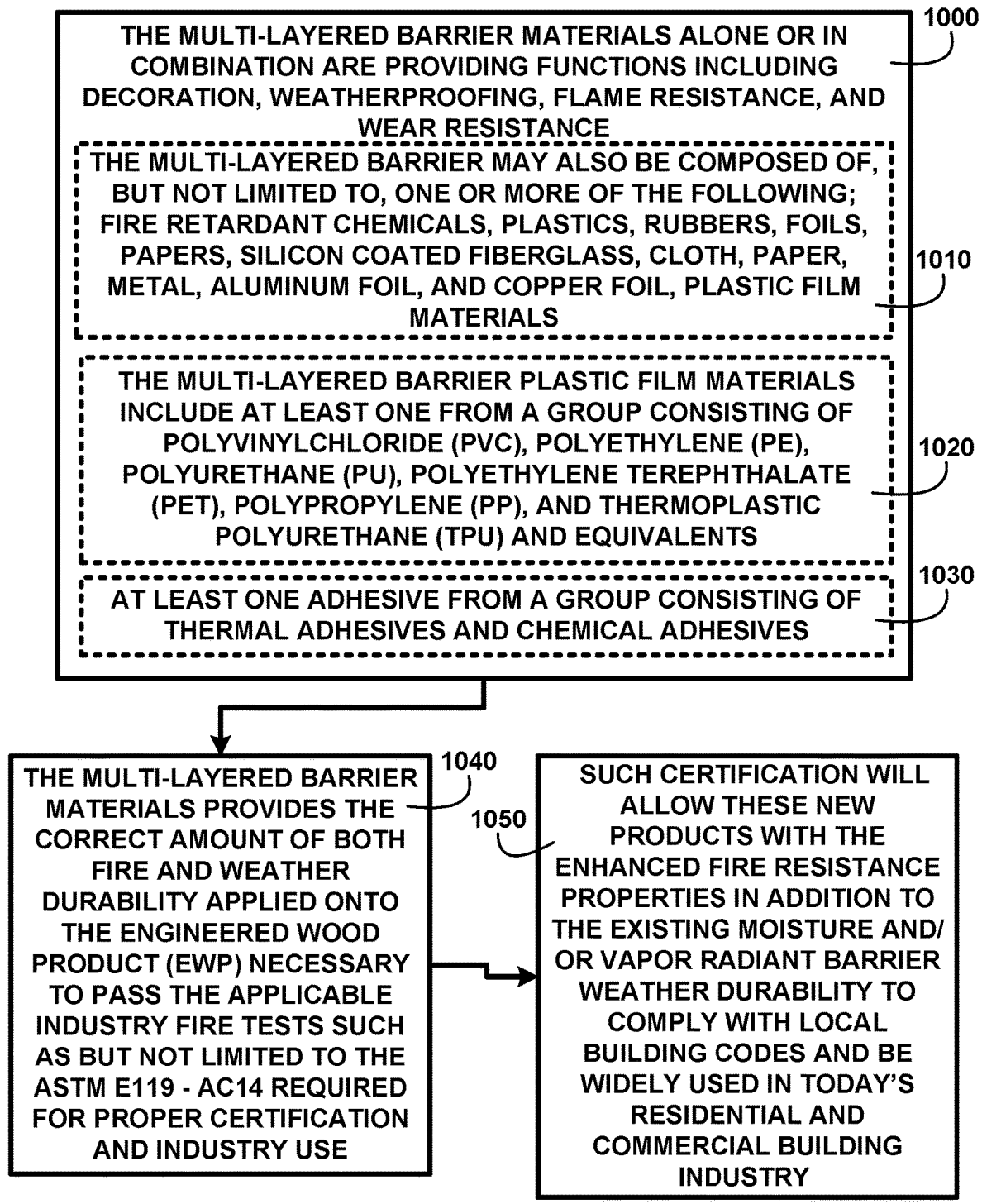
FIG. 10 shows a block diagram of an overview of multi-layered barrier sensor components of one embodiment.

Multi-Layered Barrier Components:

FIG. 10 shows a block diagram of an overview of the multi-layered barrier components of one embodiment. FIG. 10 shows the multi-layered barrier can be in the form of a master roll-type product for easy production and manufacturing. The multi-layered barrier may also be composed of, but not limited to, one or more of the following; fire retardant chemicals, plastics, rubbers, foils, papers, silicon-coated fiberglass, cloth, paper, metal, aluminum foil, copper foil, plastic film materials 1010. The multi-layered barrier plastic film materials include at least one from a group consisting of polyvinyl chloride (PVC), polyethylene (PE), polyurethane (PU), polyethylene terephthalate (PET), polypropylene (PP), and thermoplastic polyurethane (TPU) and equivalents 1020.

The multi-layered barrier materials alone or in combination provide functions including decoration, weatherproofing, flame resistance, and wear resistance 1000. Each layer of the multi-layered barrier of fire retardant and vapor/moisture barrier protectant applied provides the proper amount of moisture, heat, and fire protection necessary to pass all industry testing.

The multi-layered barrier materials provide both a thermal barrier for assistance in passing industry fire testing, as well as a moisture and/or vapor barrier to protect both the engineered wood product and the fire-retardant barrier against extreme weather. The present invention system and method can incorporate the use of liquid and/or solid fire resistance and fire-retardant chemicals, including but not limited to intumescent type chemicals in both liquid form or dry form, including but not limited to a pre-manufactured type of intumescent paper or sheet-type product. The multi-layered barrier includes at least one adhesive from a group consisting of thermal adhesives and chemical adhesives 1030.

The multi-layered barrier materials provide the correct amount of both fire and weather durability applied onto the engineered wood product (EWP) necessary to pass the applicable industry fire tests such as but not limited to the ASTM E119-AC14 required for proper certification and industry use 1040. Such certification will allow these new products with enhanced fire stop properties in addition to the existing moisture and/or vapor radiant barrier weather durability to comply with local building codes and be widely used in today's residential and commercial building industry 1050.

These types of products become used as a part of the application process and are laminated and secured to an engineered wood panel product or I-joist providing enhanced fire protection as well as extreme weather conditions to withstand both fire and weather durability testing, including that identified in ASTM-E119. In one embodiment the multi-barrier system and method of the present invention will be laminated to the engineered wood panels or I-joist product.

Figure 11:
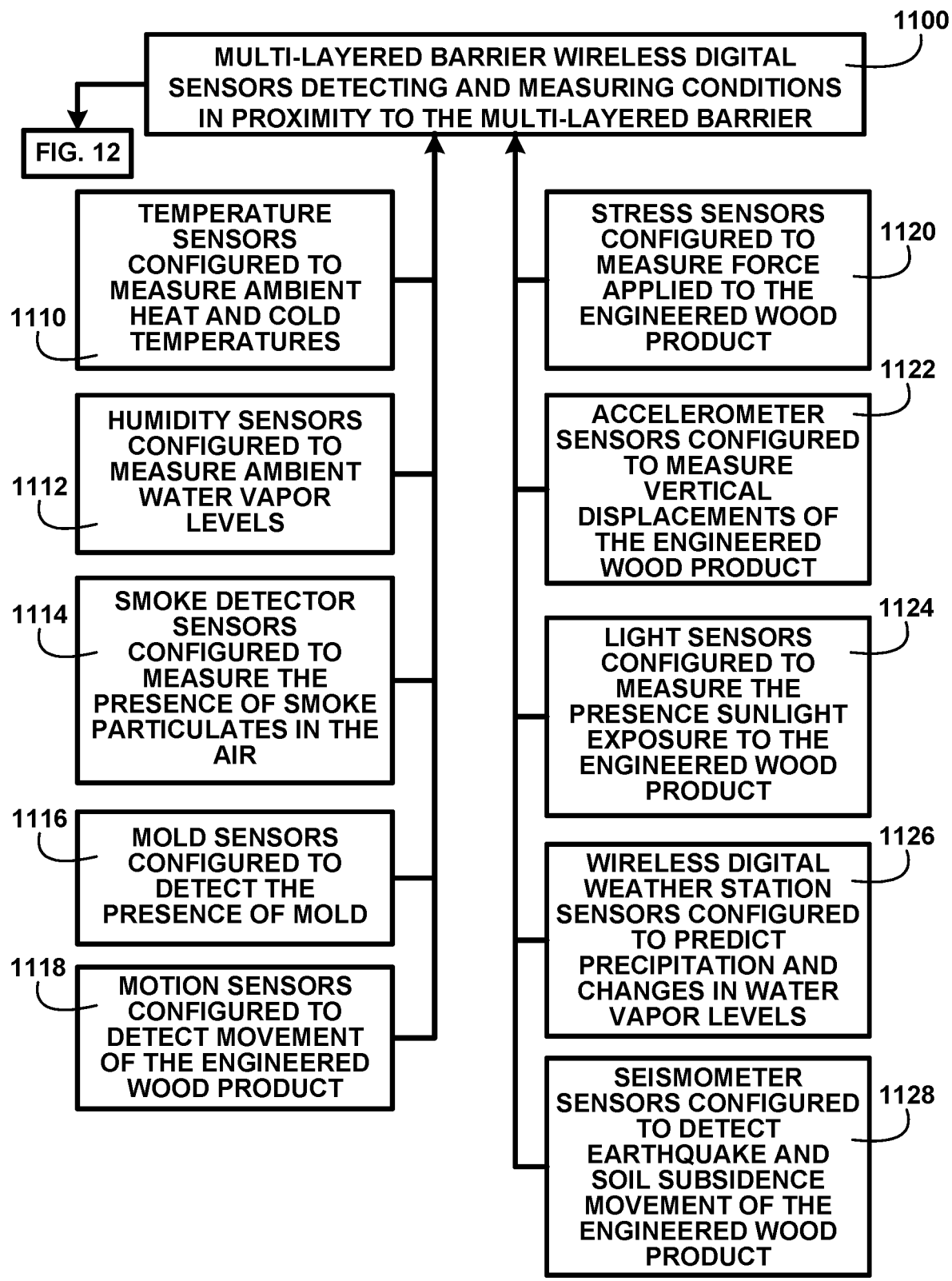
FIG. 11 shows a block diagram of an overview of wireless digital sensors, digital electronics, and communication devices of one embodiment.

Wireless Digital Sensors, Digital Electronics, and Communication Devices:

FIG. 11 shows a block diagram of an overview of wireless digital sensors, digital electronics, and communication devices of one embodiment. FIG. 11 shows multi-layered barrier wireless digital sensors detecting and measuring conditions in proximity to the multi-layered barrier 1100. Temperature sensors are configured to measure ambient heat and cold temperatures 1110. Humidity sensors configured to measure ambient water vapor levels 1112.

Smoke detector sensors are configured to measure the presence of smoke particulates in the air 1114. Mold sensors are configured to detect the presence of mold 1116. Motion sensors are configured to detect the movement of the engineered wood product 1118. Stress sensors are configured to measure the force applied to the engineered wood product. Accelerometer sensors are configured to measure vertical displacements of the engineered wood product 1122. Light sensors are configured to measure the presence of sunlight exposure to the engineered wood product 1124. Wireless digital weather station sensors configured to predict precipitation and changes in water vapor levels 1126. Seismometer sensors are configured to detect earthquakes and soil subsidence movement of the engineered wood product 1128. The descriptions continue in FIG. 12.

Figure 12:
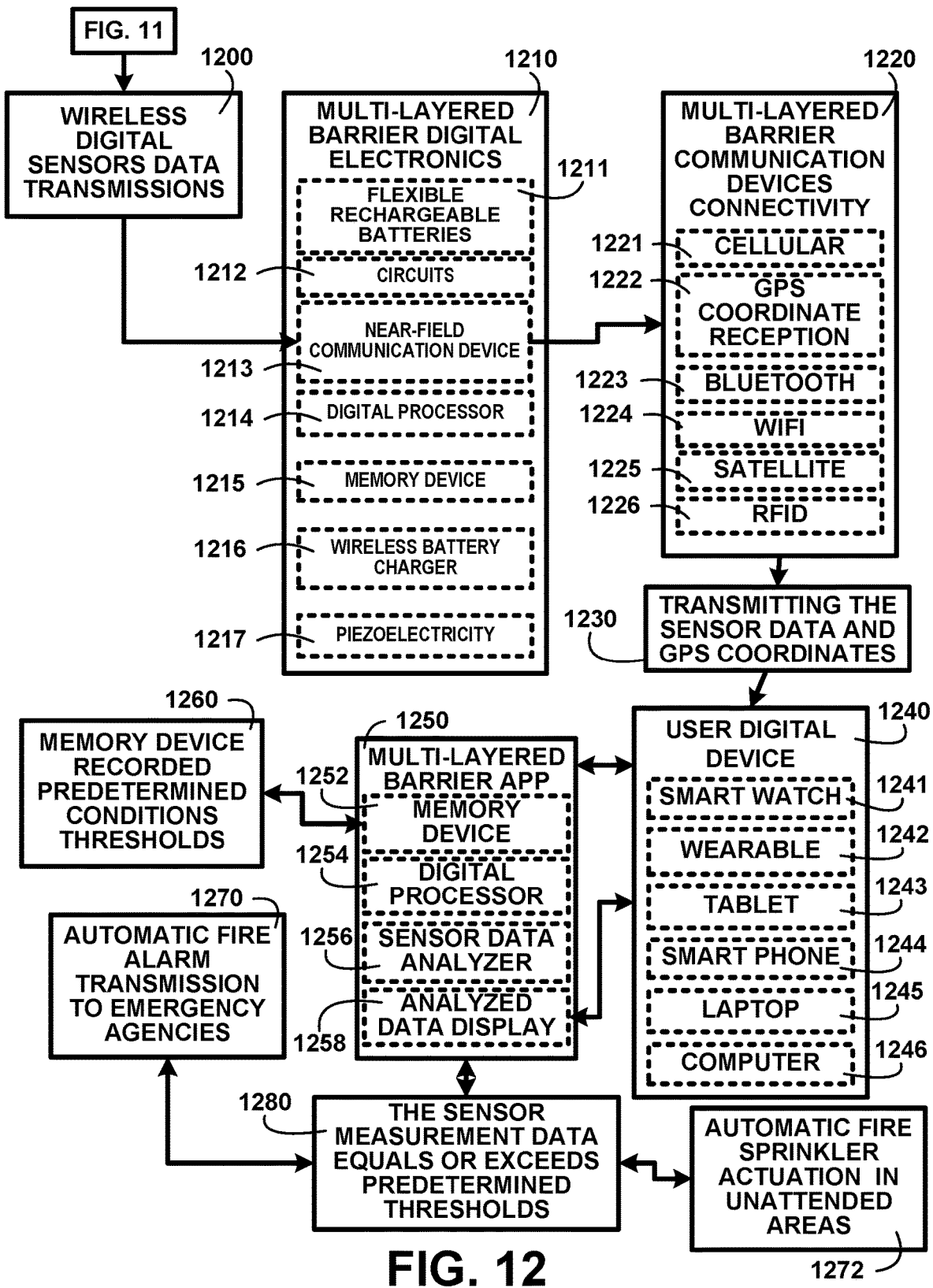
FIG. 12 shows a block diagram of an overview of wireless digital sensor data transmissions of one embodiment.

Wireless Digital Sensors Data Transmissions:

FIG. 12 shows a block diagram of an overview of wireless digital sensor data transmissions of one embodiment. FIG. 12 shows a continuation from FIG. 11 with wireless digital sensors data transmissions 1200. The multi-layered barrier wireless digital sensors data is transmitted to the multi-layered barrier digital electronics 1210 near-field communication device 1213. The multi-layered barrier digital electronics also includes in each module flexible rechargeable batteries 1211, circuits 1212, digital processor 1214, memory device 1215, a wireless battery charger 1216, and piezoelectricity 1217 of one embodiment.

The multi-layered barrier communication devices connectivity 1220 includes cellular 1221; GPS coordinate reception 1222, Bluetooth 1223, WIFI 1224, Satellite 1225, and RFID 1226. The multi-layered barrier digital electronics near-field communication device receives sensor data that is transmitted to the multi-layered barrier communication devices.

The multi-layered barrier communication devices transmit the sensor data and GPS coordinates 1230 over the available connectivity to a user's digital device 1240. The user's digital device 1240 may include at least one of the following: smart watch 1241, wearable 1242, tablet 1243, smartphone 1244, laptop 1245, and computer 1246. A multi-layered barrier app 1250 is installed on at least one of the user's digital devices. The multi-layered barrier app uses the user's digital device memory device 1252 to record and retrieve predetermined conditions thresholds. A digital processor 1254 processes the incoming transmitted sensor data and transmits the data to a sensor data analyzer 1256. The sensor data analyzer 1256 compares the incoming sensor data to the memory device recorded predetermined conditions thresholds 1260.

If the sensor measurement data equals or exceeds predetermined thresholds in the case of temperatures and smoke detection an automatic fire alarm transmission to emergency agencies 1270 with the GPS coordinates is transmitted for the presence of fire. Automatic fire sprinkler actuation in unattended areas 1272 for example, during closed hours or evacuation due to dangerous weather conditions. Automatic fire sprinkler actuation is activated when temperature thresholds are reached. Before reaching the temperature thresholds an alert is transmitted to the user who may elect to deactivate the automatic fire sprinkler actuation to prevent, for example, unnecessary water damage. The analyzed data display 1258 is displayed in text on the user's digital device and an audible alarm is produced when the sensor measurement data equals or exceeds predetermined thresholds 1280 of one embodiment.

Figure 13:
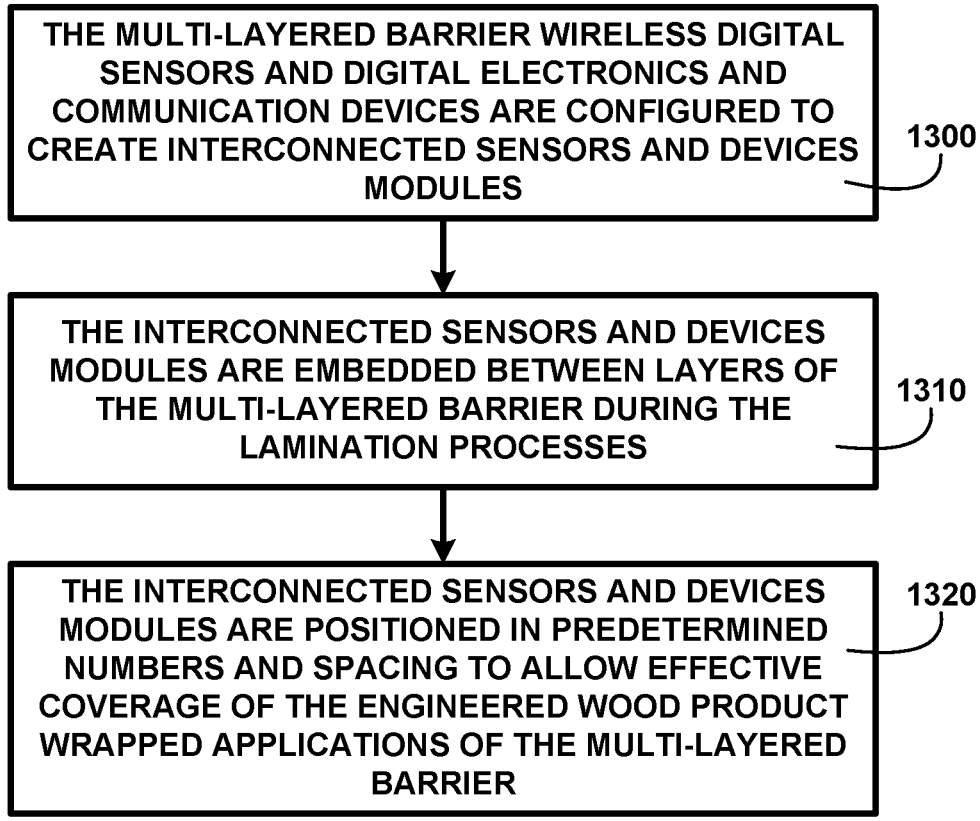
FIG. 13 shows a block diagram of an overview of interconnected sensors and device modules of one embodiment.

Interconnected Sensors and Devices Modules:

FIG. 13 shows a block diagram of an overview of interconnected sensors and device modules of one embodiment. FIG. 13 shows the multi-layered barrier wireless digital sensors and digital electronics and communication devices configured to create interconnected sensors and devices modules 1300. The interconnected sensors and device modules are embedded between layers of the multi-layered barrier during the lamination processes 1310. The interconnected sensors and device modules are positioned in predetermined numbers and spacing to allow effective coverage of the engineered wood product-wrapped applications of the multi-layered barrier 1320.

Wireless digital sensors and digital electronics and communication devices may include at least every smartphone that has a 3-dimensional coordinate system. Based on this system, sensors in your smartphone detect and record changes in real time. Motion sensors detect the movement, acceleration, and rotation along the three axes of the device's coordinate system. Some examples of motion sensors are accelerometers, gravity sensors, and gyroscopes. An accelerometer records the movement of your device along the three axes of the coordinate system. The X-axis measures the movement of your device from side to side, the Y-axis measures the movement along the top and bottom (including gravity), and the Z-axis measures the movement forward and backward.

A gyroscope measures the rotation along the three axes of the device's coordinate system. It detects the exact measure of your phone's rotation in radians per second. Position sensors record the physical location of the device. They do this by identifying your phone's coordinates—taking the world around them as a frame of reference and its orientation in 3-dimensional space. Phones use them for navigation, detecting screen orientation, and much more. Examples of position sensors are proximity sensors, GPS, and magnetometers.

A magnetometer senses your phone's orientation according to the earth's magnetic field. This sensor is essential to navigation and compass apps as it helps your phone identify directions and adjust the map accordingly. A Global Positioning System (GPS) is a sensor with antennas to help navigation. It receives continuous signals from satellites that help calculate the distance traveled and the location of your phone. Environmental sensors detect any significant changes in the surroundings of your smartphone. For example, these include changes in the lighting, pressure, temperature, adjusting the brightness when the auto-brightness is enabled, display temperature, measuring air pressure, and more. Examples of environmental sensors are ambient light sensors, thermometers, barometers, air-humidity sensors, etc. Ambient light sensors measure the intensity of light around the device. These sensors detect the changes in brightness of the surroundings and record their intensity.

Proximity sensors detect how close a certain object is to your phone. A quick example of this is your phone's display turning off when you pick up and answer a call. This helps save battery power and avoids accidental taps during phone calls. A Hall sensor is quite similar to a proximity sensor, except it detects changes in the magnetic fields around the device. When it senses a change in the magnetic field, it sends this data to the processor, turning off the phone's display.

This sensor is specifically used to detect the magnets in flip covers. In this example, proximity sensors work by measuring the distance between the screen and your ear, and when the distance equals a set value, it turns off the display before your ear touches the screen. Biometric sensors use physical attributes for identification and are typically used for security purposes. As physical features like fingerprints, irises, and faces are unique to a person, using them for identity authentication provides enhanced protection. Some of the biometric sensors are Fingerprint Scanners and Iris sensors. Atmospheric sensors detect several aspects of your device's surroundings like atmospheric pressure, ambient temperature, air humidity, etc. Atmospheric sensors include a Thermometer, Barometer, and Air humidity sensors of one embodiment.

Vision and Imaging Sensors/Detectors are electronic devices that detect the presence of objects or colors within their fields of view and convert this information into a visual image for display. Temperature Sensors/Detectors/Transducers are electronic devices that detect thermal parameters and provide signals to the inputs of control and display devices. Radiation Sensors/Detectors are electronic devices that sense the presence of alpha, beta, or gamma particles and provide signals to counters and display devices. Proximity Sensors are electronic devices used to detect the presence of nearby objects through non-contacting means.

Pressure/Sensors/Detectors/Transducers are electro-mechanical devices that detect forces per unit area in gases or liquids and provide signals to the inputs of control and display devices. Position Sensors/Detectors/Transducers are electronic devices used to sense the positions of valves, doors, throttles, etc., and supply signals to the inputs of control or display devices. Photoelectric sensors are electrical devices that sense objects passing within their field of detection, although they are also capable of detecting color, cleanliness, and location if needed. Particle Sensors/Detectors are electronic devices used to sense dust and other airborne particulates and supply signals to the inputs of control or display devices.

Motion Sensors/Detectors/Transducers are electronic devices that can sense the movement or stoppage of parts, people, etc., and supply signals to the inputs of control or display devices. Metal Detectors are electronic or electro-mechanical devices used to sense the presence of metal in a variety of situations ranging from packages to people. Level Sensors/Detectors are electronic or electro-mechanical devices used for determining the height of gases, liquids, or solids in tanks or bins and providing signals to the inputs of control or display devices.

Leak Sensors/Detectors are electronic devices used for identifying or monitoring the unwanted discharge of liquids or gases. Humidity Sensors/Detectors/Transducers are electronic devices that measure the amount of water in the air and convert these measurements into signals that can be used as inputs to control or display devices. Gas and Chemical Sensors/Detectors are fixed, or portable electronic devices used to sense the presence and properties of various gases or chemicals and relay signals to the inputs of controllers or visual displays.

Force Sensors/Transducers are electronic devices that measure various parameters related to forces such as weight, torque, load, etc., and provide signals to the inputs of control or display devices. A force sensor typically relies on a load cell, a piezoelectric device whose resistance changes under deforming loads. Flow Sensors/Detectors are electronic or electro-mechanical devices used to sense the movement of gases, liquids, or solids and provide signals to the inputs of control or display devices.

Flaw Sensors/Detectors are electronic devices used in a variety of manufacturing processes to uncover inconsistencies on surfaces or in underlying materials such as welds. Flame Detectors are optoelectronic devices used to sense the presence and quality of fire and provide signals to the inputs of control devices. Electrical Sensors/Detectors/Transducers are electronic devices that sense current, voltage, etc., and provide signals to the inputs of control devices or visual displays. Non-contact sensors are devices that do not require a physical touch between the sensor and the object being monitored to function.

Infrared sensors use infrared light in various forms. Some detect the infrared radiation emitted by all objects. Others cast infrared beams that are reflected to sensors that look for interruptions of the beams. Temperature sensors generally rely on RTDs or thermistors to sense changes in temperature through the change in electrical resistance that occurs in materials. Non-contacting proximity sensors often use Hall effect phenomena, eddy currents, or capacitive effects to detect the nearness of conductive metals. Other methods are used as well, including optical and laser. Where proximity sensors can be used to detect small changes in the positions of targets, simple on/off proximity switches use the same methods to detect, for instance, an open door.

Ultrasonic sensors measure the time between the emission and reception of ultrasonic waves to determine the distance to a tank's contents, for example. In another form, ultrasonic sensors detect the ultrasonic energy emitted by leaking air, etc. Force and pressure sensors typically use strain gages or piezoelectric devices which change their resistance characteristics under applied loads. These changes can be calibrated over the linear ranges of the transducers to produce measures of weight (force) or pressure (force per unit area). Vision sensors typically rely on CCD, infrared, or ultraviolet cameras to produce images that can be interpreted by software systems to detect flaws, sense barcodes, etc. of one embodiment.

Encoders are electromechanical devices that are used to convert linear or rotary motions to analog or digital output signals. Load Cells are mechanical or electronic devices designed to convert forces, either compressive, tensile, torsional, or shear, into electrical signals. Monitors are typically electronic devices used to remotely or conveniently view information as required. Data Acquisition Systems (abbreviated DAQ or DAS) collect analog signals from sensors measuring real-world samples and transduce them into digital formats that are processed by data loggers. Data Loggers are electronic data storage devices used to gather and record various data-over-time measurements. Digital switches are electromechanical devices that are used in electrical circuits. Thermocouples are mechanical devices formed of dissimilar metal wires welded together and used for the measurement of the temperature of one embodiment.

Figure 14:
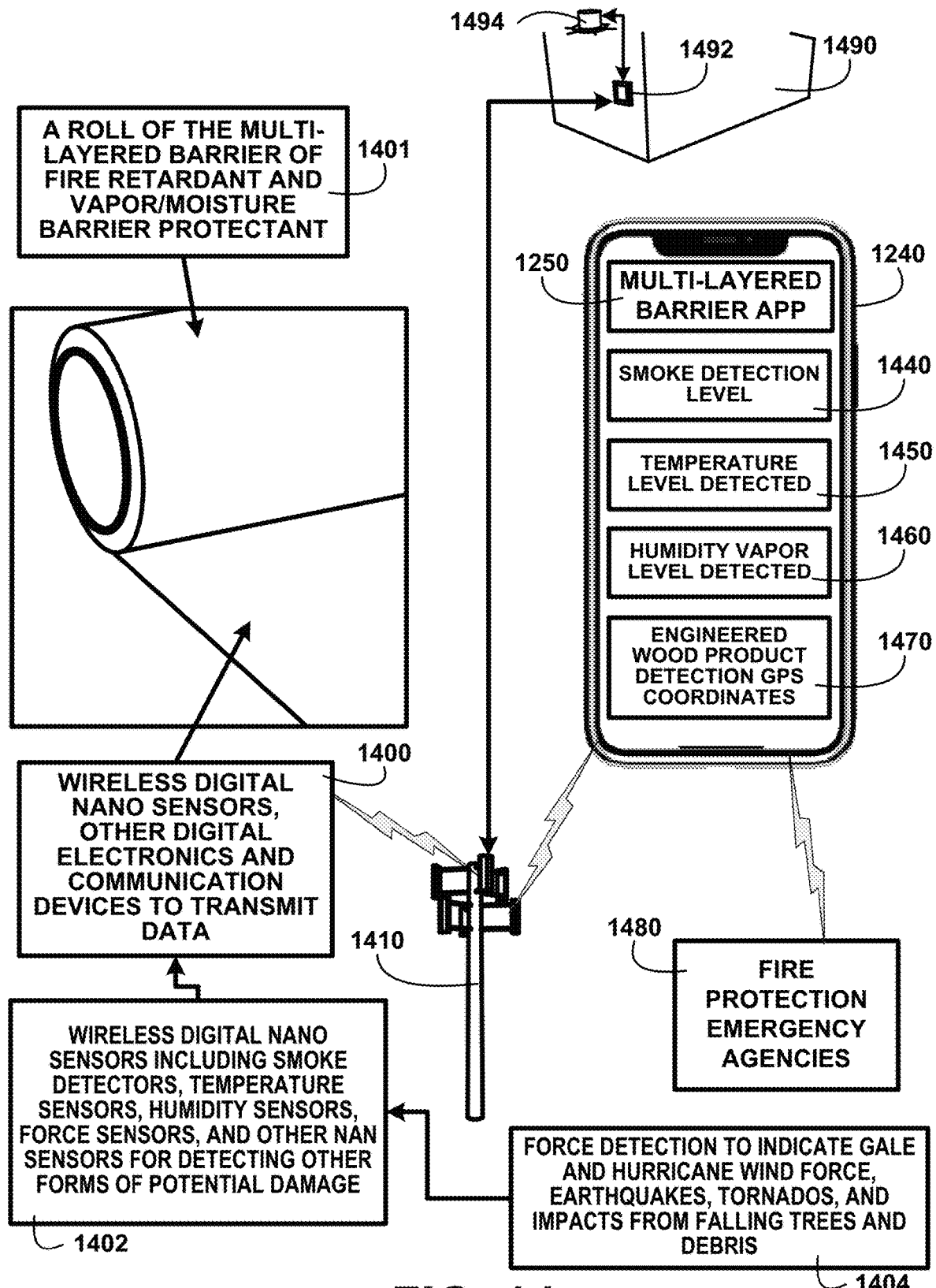
FIG. 14 shows for illustrative purposes only an example of a multi-layered barrier app of one embodiment.

A Multi-Layered Barrier App:

FIG. 14 shows for illustrative purposes only an example of a multi-layered barrier app of one embodiment. FIG. 14 shows a roll of the multi-layered barrier of fire retardant and vapor/moisture barrier protectant 1401 after lamination including the wireless digital sensors, other digital electronics, and communication devices transmissions 1400. Wireless digital nanosensors including smoke detectors, temperature sensors, humidity sensors, force sensors, and other nanosensors for detecting other forms of potential damage 1402. Force detection indicates gale and hurricane wind forces, earthquakes, tornados, and impacts from falling trees and debris 1404.

The communication devices with cellular connectivity transmit the data transmissions to a cell tower 1410. The cellular data transmissions are received by a user digital device 1240 with a multi-layered barrier app 1250. The sensors' data transmissions are displayed on, for example, a user smartphone including a smoke detection level 1440, temperature level detected 1450, and humidity vapor level detected 1460. The data transmissions include the engineered wood product detection GPS coordinates 1470. The engineered wood product detection GPS coordinates 1470 are stored on the user's smartphone and are automatically queried to display a street address corresponding to the GPS coordinates.

The multi-layered barrier app is configured to automatically transmit an alarm to fire protection emergency agencies 1480 when either sensor detected smoke levels and/or heat temperatures reach predetermined thresholds indicating the presence of fire. The street address corresponding to the GPS coordinates is also included in the fire protection emergency agencies 1480 automatic alarm transmission. An unattended area 1490 is shown with an automatic fire sprinkler actuator 1492 mounted on a wall.

Should temperatures reach predetermined temperature thresholds just below combustible temperatures a wireless signal is transmitted, and the fire sprinkler activation begins 1494. Once a fire has broken out the emergency services are alerted. The fire sprinkler activation would begin well before the arrival of the emergency services and may prevent the combustion of materials and at least minimize the fire spreading and assist the emergency services in their action to contain and extinguish the fire of one embodiment.

Figure 15:
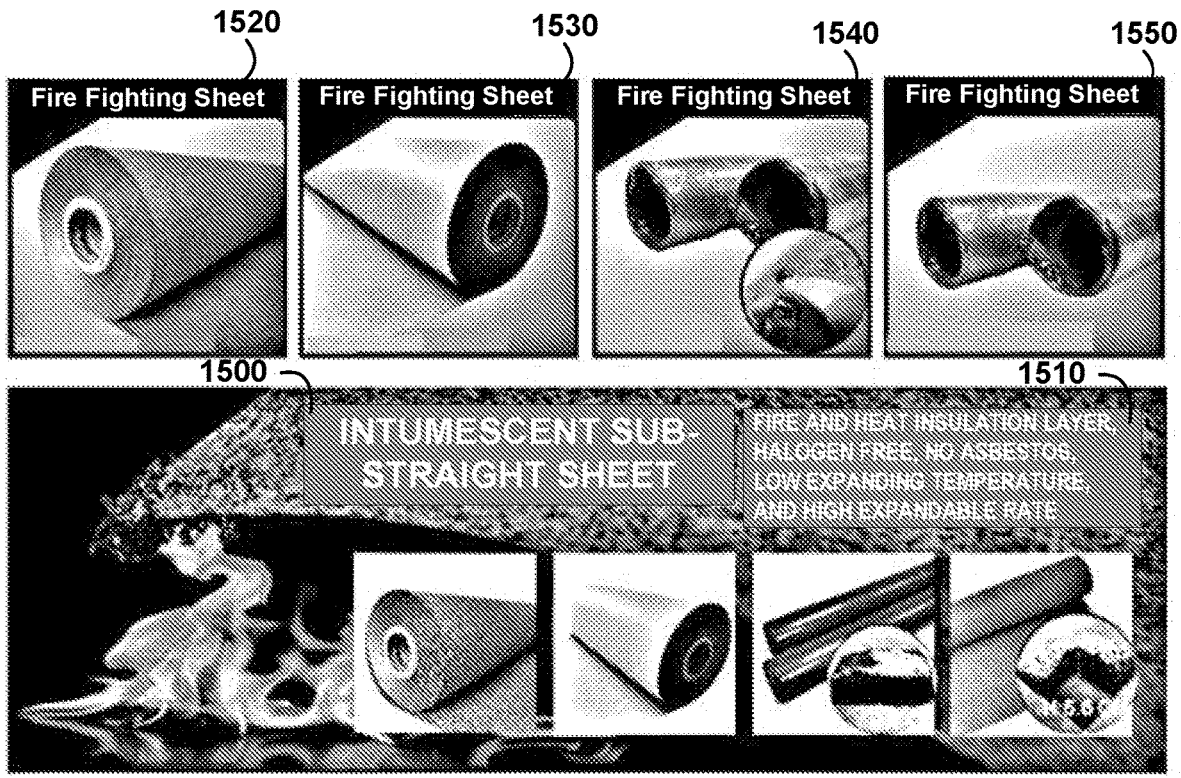
FIG. 15 shows for illustrative purposes only an example of an intumescent sub-straight sheet of one embodiment.

Intumescent Sub-Straight Sheet:

FIG. 15 shows for illustrative purposes only an example of an intumescent sub-straight sheet of one embodiment. FIG. 15 shows an intumescent sub-straight sheet 1500 which is one of the layers of the multi-layered barrier. The multi-layered barrier consists of a fire and heat insulation layer, is halogen-free, has no asbestos, low expanding temperature, and high expandable rate 1510. The multi-layered barrier lamination includes an intumescent paper firefighting sheet 1520, a foil-type product firefighting sheet 1530, and a glass fiber-type product firefighting sheet 1540. FIG. 15 shows the finished layered laminate firefighting sheet with sensors 1550 of one embodiment.

Figure 16:
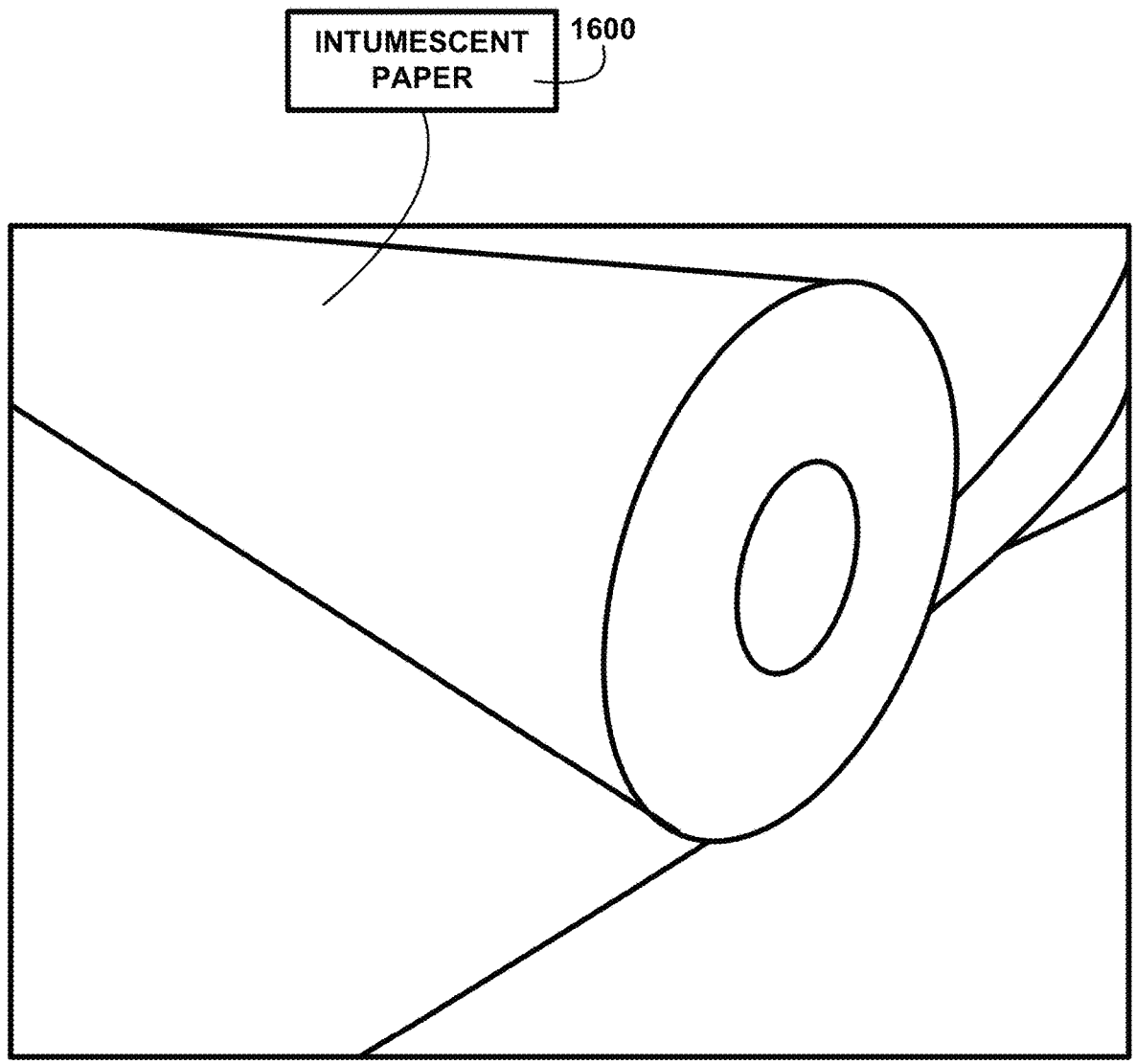
FIG. 16 shows for illustrative purposes only an example of an intumescent paper of one embodiment.

Intumescent Paper:

FIG. 16 shows for illustrative purposes only an example of an intumescent paper of one embodiment. FIG. 16 shows an intumescent paper 1600 material used for a layer in the multi-layered barrier lamination. The intumescent paper 1600 material has chemical characteristics of swelling up when heated, thus protecting the material underneath, or sealing a gap in the event of a fire. Testing has found the intumescent paper 1600 material swells with an expansion ratio ranging from 20 to 40 times its original thickness. Other characteristics include a char porosity ranging from 0.95 to 0.98 with density ranging from 30 to 50 kg/m3, and a thermal conductivity coefficient ranging from 0.04 to 0.1 W/(m K) of one embodiment.

Figure 17:
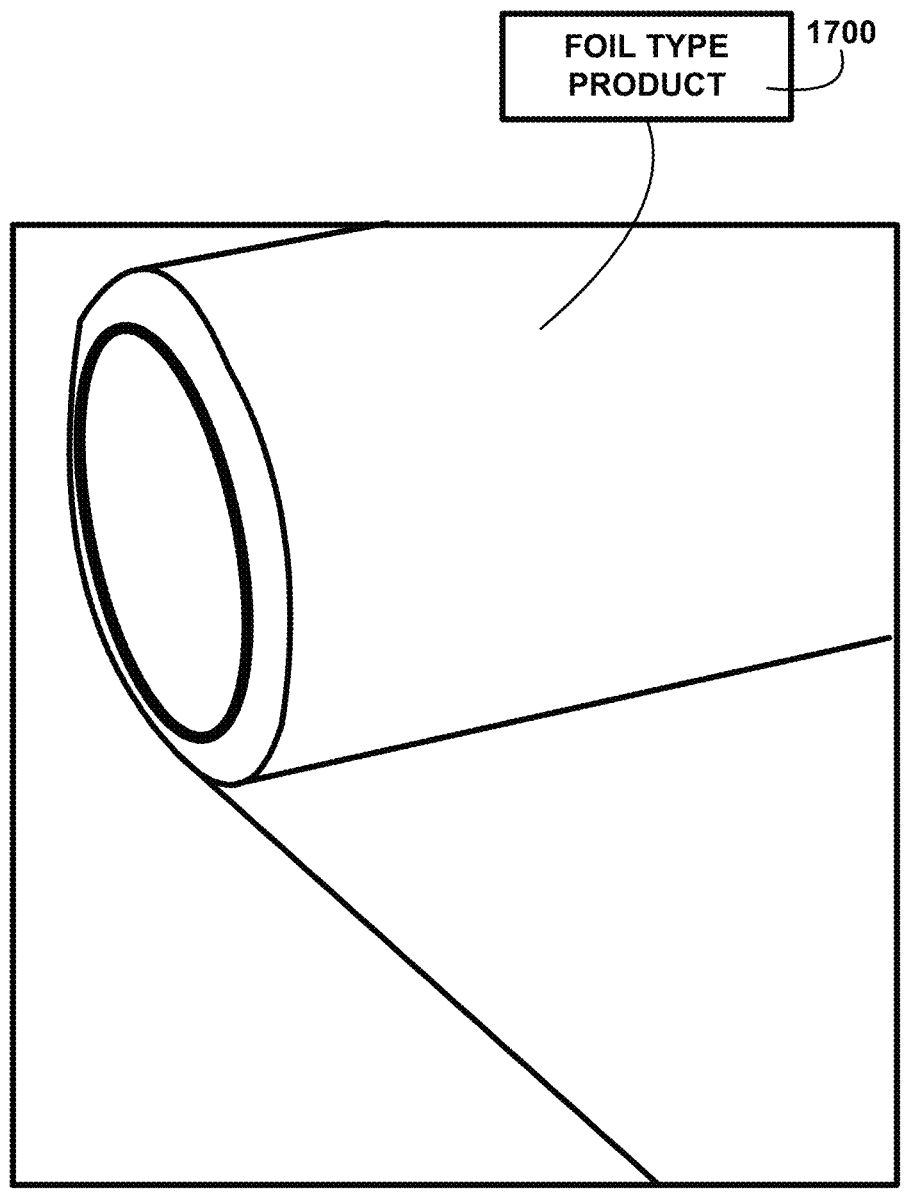
FIG. 17 shows for illustrative purposes only an example of foil type product of one embodiment.

Foil Type Product:

FIG. 17 shows for illustrative purposes only an example of foil type product of one embodiment. FIG. 17 shows a foil-type product 1700 used for a layer in the multi-layered barrier lamination. The flexible aluminum foil sheets deflect heat away from buildings, helping prevent flammable materials from combusting. The foil-type product 1700 can withstand the heat of up to 1,022 degrees Fahrenheit (550 Celsius) of one embodiment.

Figure 18:
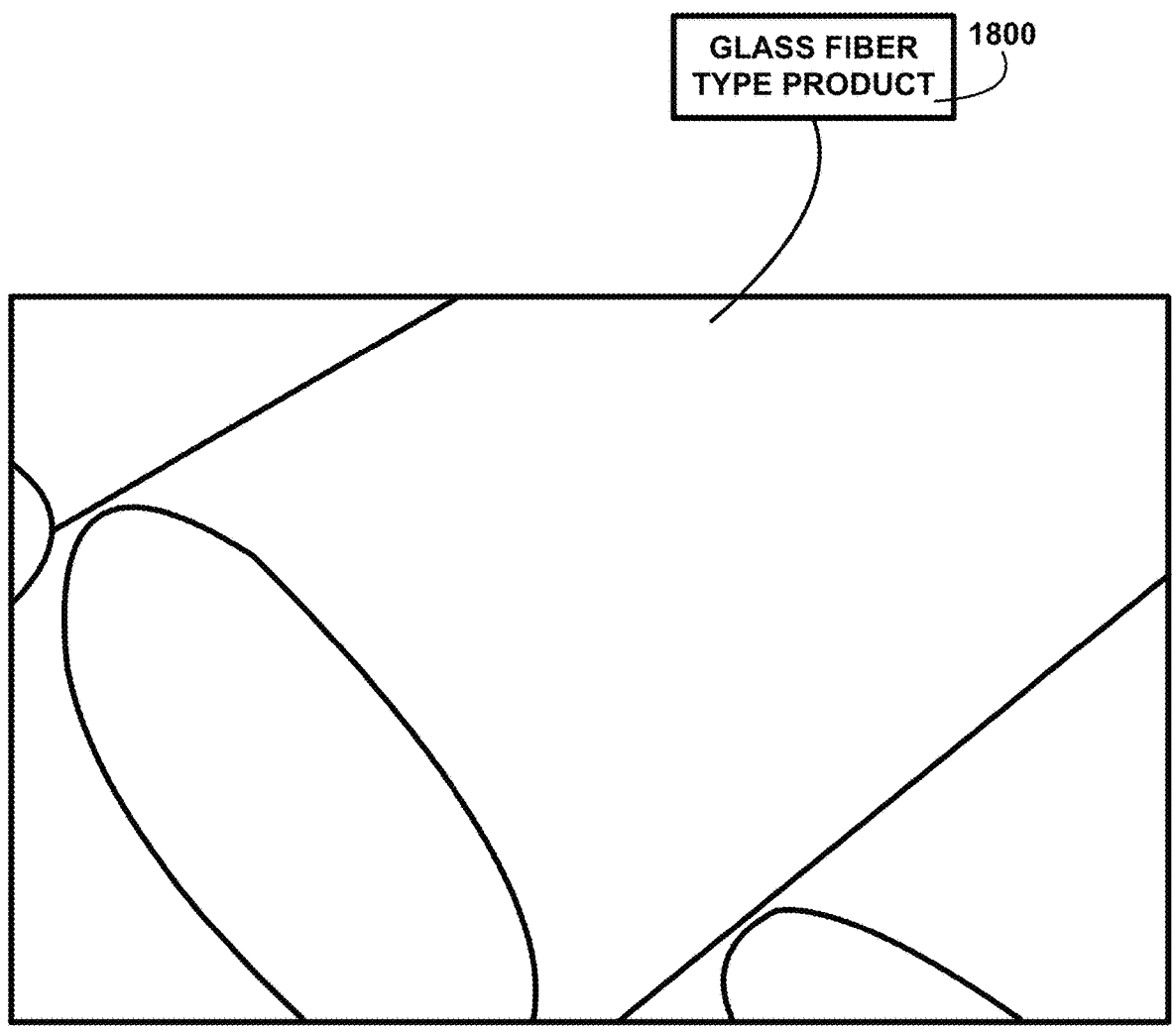
FIG. 18 shows for illustrative purposes only an example of a glass fiber-type product of one embodiment.

Glass Fiber Type Product:

FIG. 18 shows for illustrative purposes only an example of a glass fiber-type product of one embodiment. FIG. 18 shows a glass fiber type product 1800 used for a layer in the multi-layered barrier lamination. The glass fiber type product 1800 is not flammable and fire-resistant. The glass fiber type product 1800 will melt at temperatures above 1000 degrees Fahrenheit (540 Celsius) of one embodiment.

Figure 19:
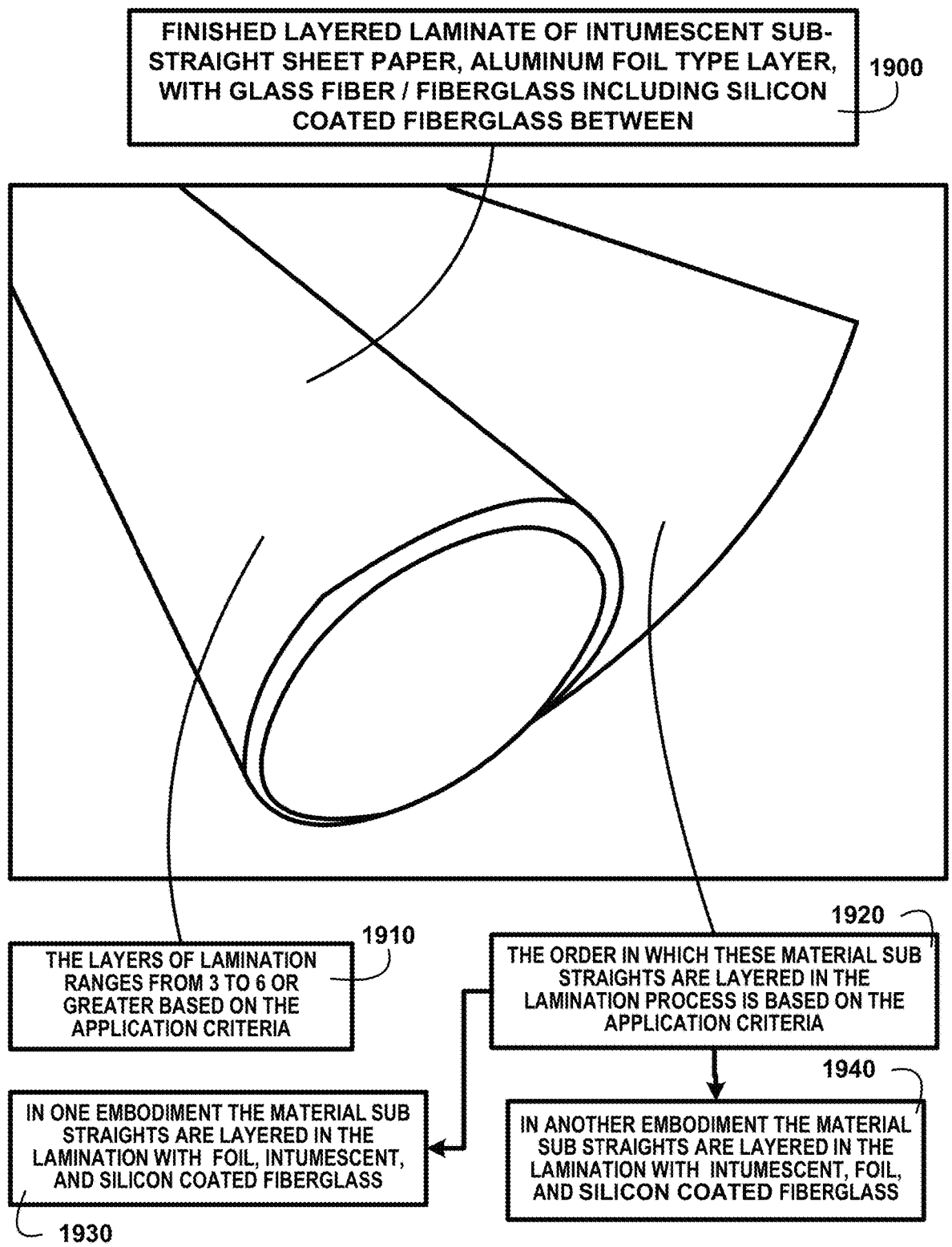
FIG. 19 shows for illustrative purposes only an example of a finished layered laminate of one embodiment.

Finished Layered Laminate:

FIG. 19 shows for illustrative purposes only an example of a finished layered laminate of one embodiment. FIG. 19 shows the finished layered laminate of intumescent sub-straight sheet paper, aluminum foil type layer, with glass fiber/fiberglass including silicon coated fiberglass between the other layers 1900. In one embodiment, alternatively, the top surface can be a silicon-based material for the top surface instead of aluminum foil on the top surface.

The layers of lamination range from 3 to 6 or greater based on application criteria 1910. The order in which these material substrates are layered in the lamination process is based on application criteria 1920. In one embodiment the material substrates are layered in the lamination with foil, intumescent, and silicon-coated fiberglass 1930. In another embodiment, the material substrates are layered in the lamination with intumescent, foil, and silicon-coated fiberglass 1940 of one embodiment.

Figure 20:
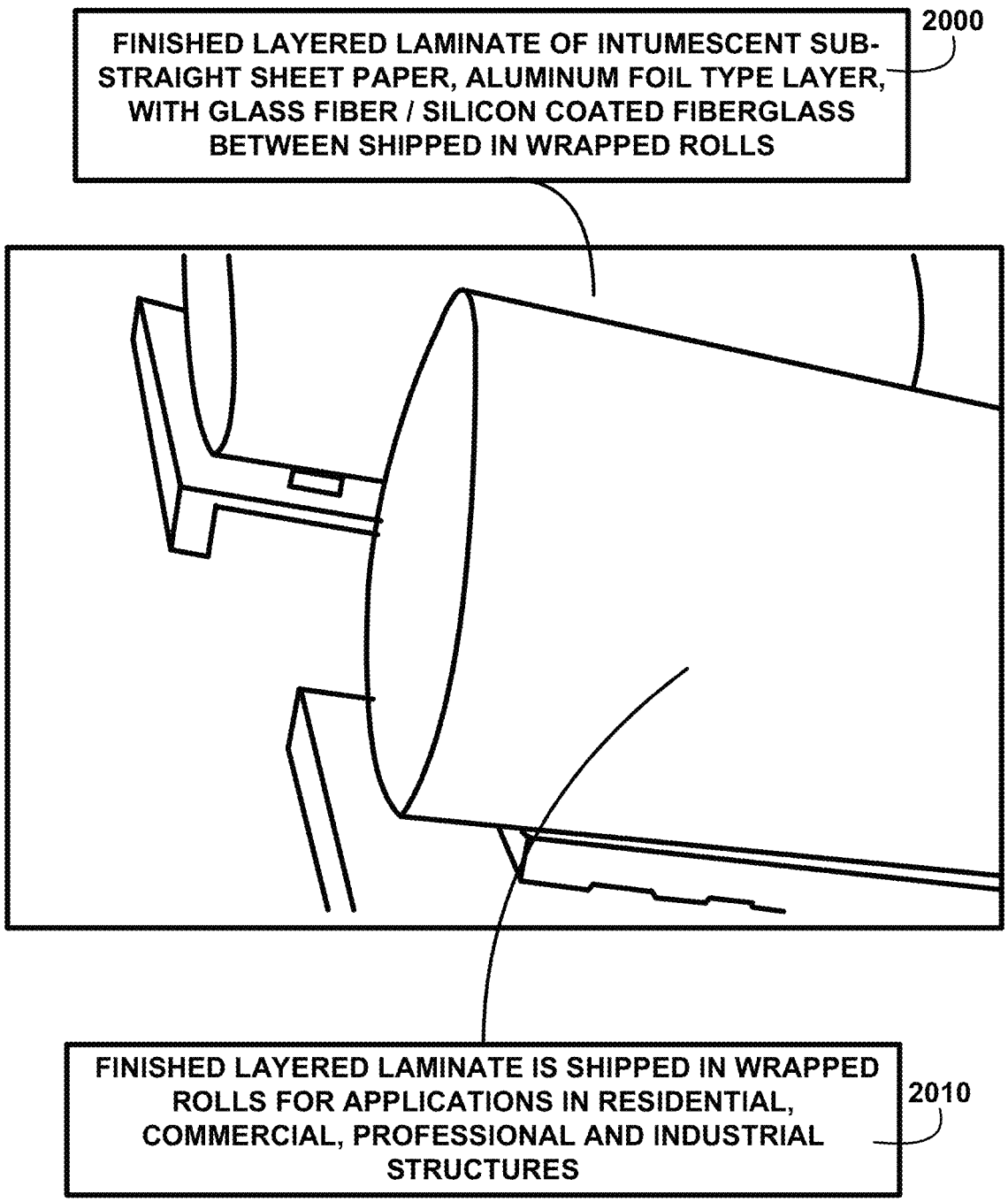
FIG. 20 shows for illustrative purposes only an example of finished layered laminate shipping of one embodiment.

Finished Layered Laminate Shipping:

FIG. 20 shows for illustrative purposes only an example of finished layered laminate shipping of one embodiment. FIG. 20 shows a finished layered laminate of intumescent substrate sheet paper, aluminum foil type layer, with glass fiber/fiberglass including silicon coated fiberglass between shipped-in wrapped rolls 2000. Finished layered laminate is shipped in wrapped rolls for applications in residential, commercial, professional, and industrial structures 2010 of one embodiment.

Figure 21:
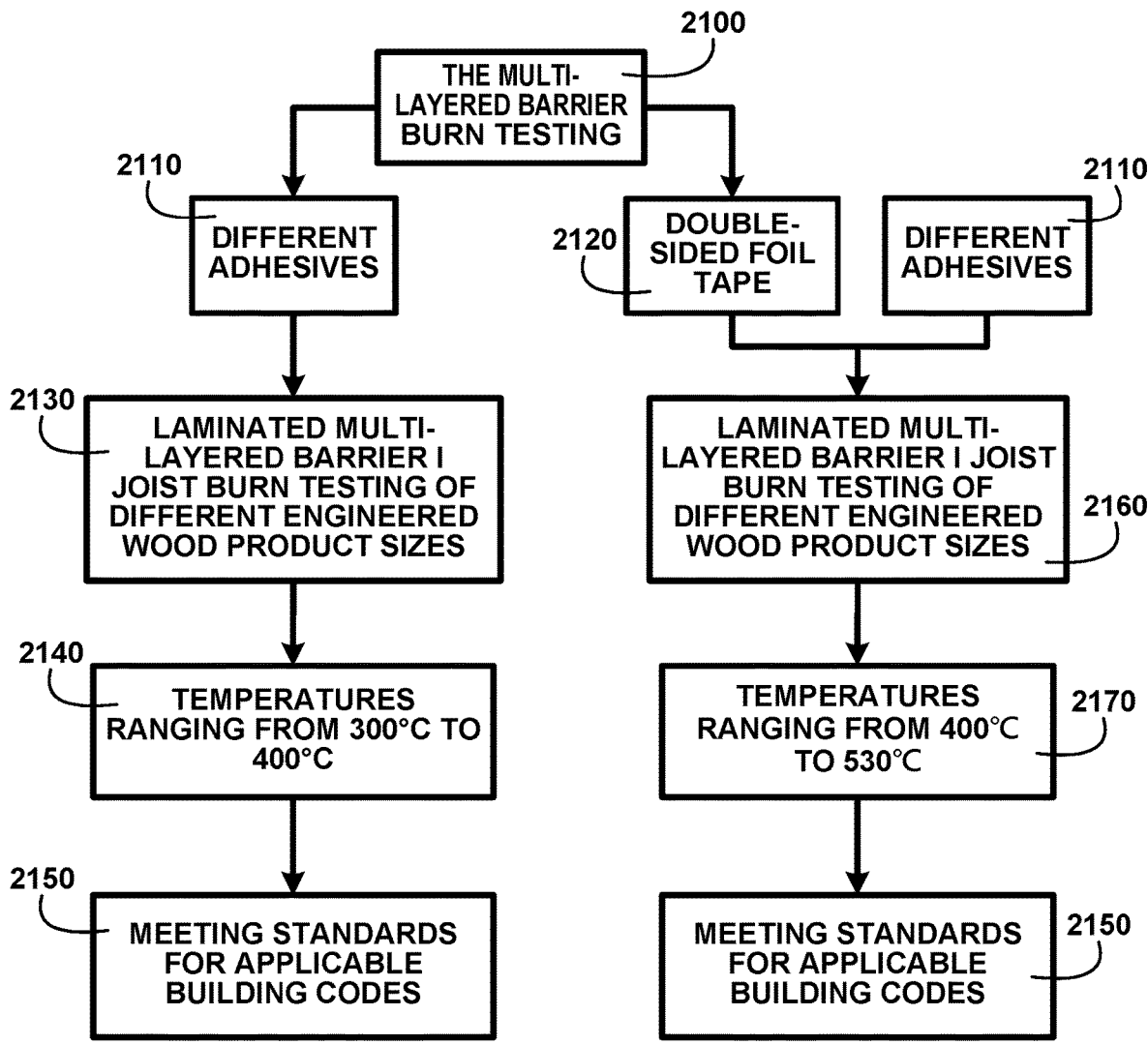
FIG. 21 shows a block diagram of an overview of the multi-layered barrier burn testing of one embodiment.

Multi-Layered Barrier Burn Testing:

FIG. 21 shows a block diagram of an overview of the multi-layered barrier burn testing of one embodiment. FIG. 21 shows the multi-layered barrier burn testing 2100 in the first series of testing using different adhesives 2110. The laminated multi-layered barrier I-joist burn testing of different engineered wood product sizes 2130 includes using each different adhesive and attaching the laminated multi-layered barrier to each of the different engineered wood product sizes. The testing is performed with temperatures ranging from 300° C. to 400° C. 2140. These testing results showed the laminated multi-layered barrier-wrapped different engineered wood product sizes demonstrated the laminated multi-layered barrier was meeting standards for applicable building codes 2150. In one embodiment the laminates product is up to AC-14 standard and/or ASTM D8391 and is listed to these standards.

In a second series of testing the different engineered wood product sizes were wrapped with the laminated multi-layered barrier with a double-sided foil tape 2120 and attached with each of the different adhesives 2110. The burn testing used temperatures ranging from 400° C. to 530° C. 2170. The laminated multi-layered barrier I-joist burn testing of different engineered wood product sizes 2160 were exposed to temperatures ranging from 400° C. to 530° C. 2170 and the laminated multi-layered barrier achieved meeting standards for applicable building codes 2150 of one embodiment.

Figure 22:
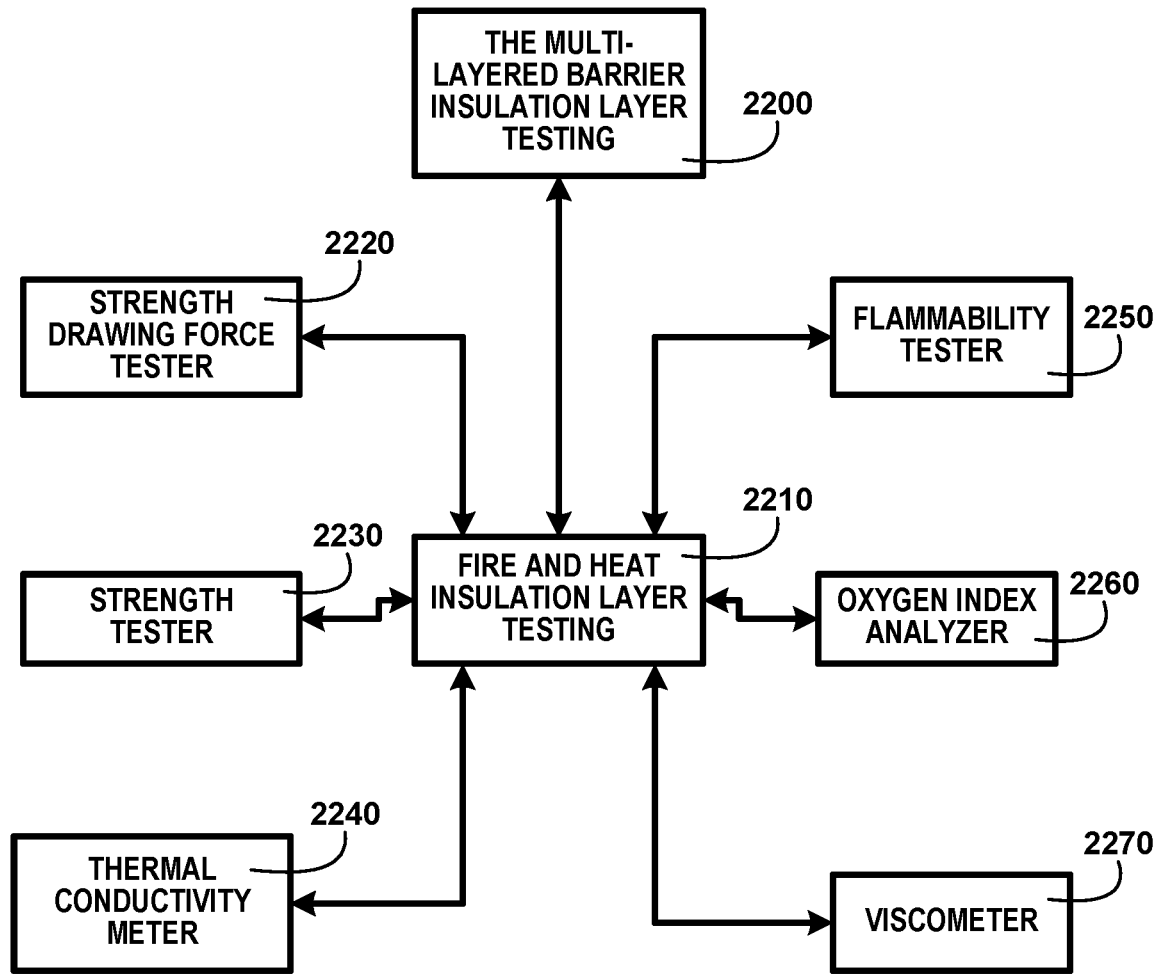
FIG. 22 shows a block diagram of an overview of the multi-layered barrier insulation layer testing of one embodiment.

Multi-Layered Barrier Insulation Layer Testing:

FIG. 22 shows a block diagram of an overview of the multi-layered barrier insulation layer testing of one embodiment. FIG. 22 shows the multi-layered barrier insulation layer testing 2200 including using fire and heat insulation layer testing 2210. The testing further included physical properties tests, for example, using a strength drawing force tester 2220 and using a strength tester 2230.

A thermal conductivity meter 2240 measured the efficiency of preventing or reducing the conduction of heat through the barrier. A flammability tester 2250 was used to measure the resistance of the laminated multi-layered barrier to react to flames and fire to combust. An oxygen index analyzer 2260 determines the oxygen level of the barrier. A viscometer 2270 is used to measure any fluid motion of the components when exposed to flames and fire of one embodiment.

Figure 23:
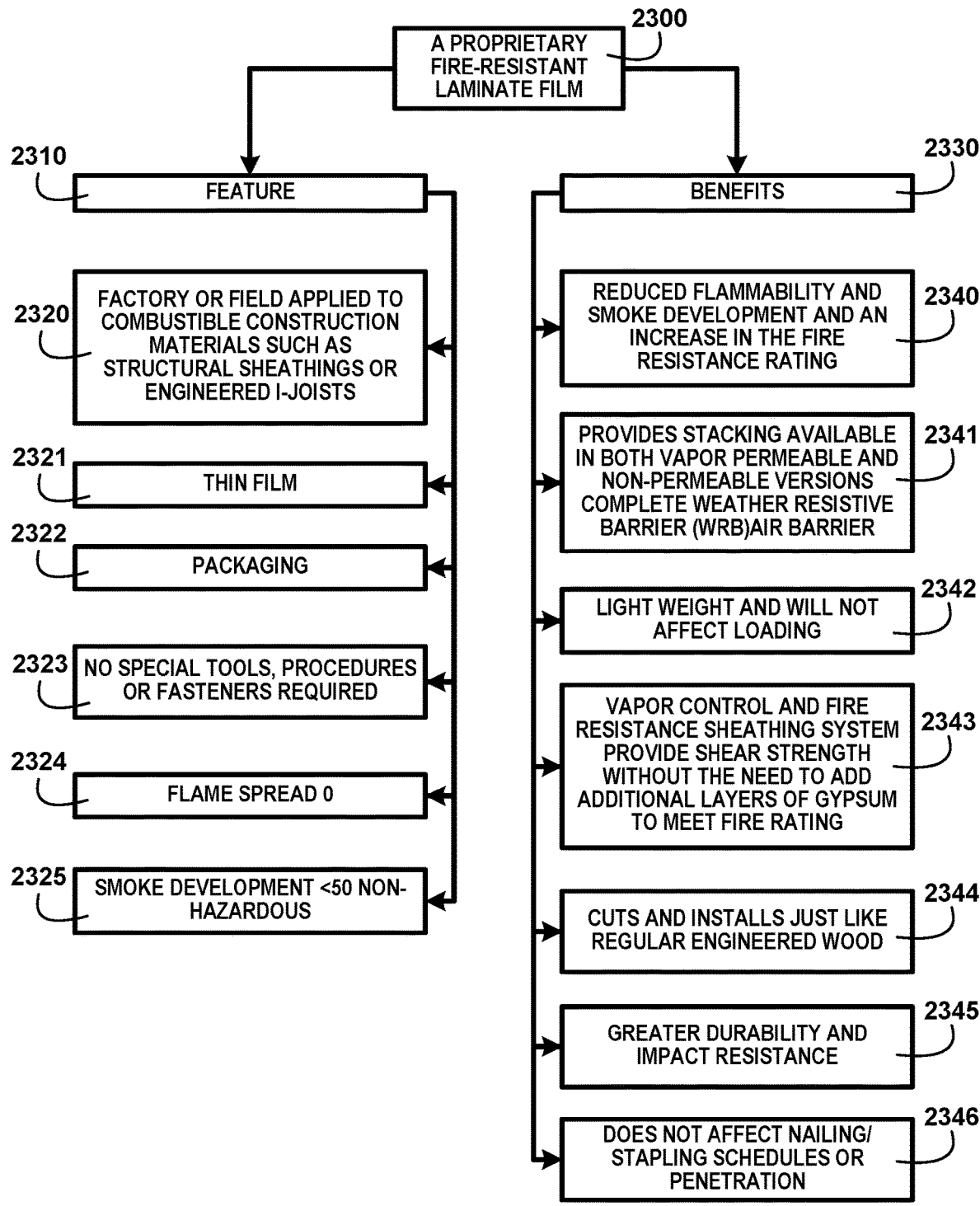
FIG. 23 shows a block diagram of an overview of one embodiment.

A Proprietary Fire-Resistant Laminate Film:

FIG. 23 shows a block diagram of an overview of a proprietary fire-resistant laminate film of one embodiment. FIG. 23 shows a proprietary fire-resistant laminate film 2300 and the features and benefits of the fire-resistant laminate film. One feature 2310 of this proprietary fire-resistant laminate film 2300 is the adaptability for application of the film in a factory or field applied to combustible construction materials including structural sheathings or engineered I-joists 2320.

This thin film 2321 feature does not add to loading upon roofs or other structures. Thin film fire-resistant laminate that can be used to provide or increase the fire resistance rating of combustible or non-combustible substrates or virtually any substrate. The packaging 2322 of the proprietary fire-resistant laminate film 2300 is adaptable to a user's applications, for example, rolls or cut sheets. The application of the proprietary fire-resistant laminate film 2300 requires no special tools, procedures or fasteners required 2323. In one embodiment, the application is performed with mechanical fastening with staples or air nails every 8 inches or laminated with thermal adhesive directly to web stock sheets in the OSB plant to be integrated with I-joists with the fire-resistant laminate film 2300 already in place.

A flame spread 0 2324 rating is a feature that assures the product's fire-retardant capabilities. A smoke development <50 non-hazardous 2325 feature rating indicates the product will not significantly smoke in a fire. The proprietary fire-resistant laminate film 2300 benefits 2330 including reduced flammability and smoke development and an increase in the fire resistance rating 2340. The proprietary fire-resistant laminate film 2300 provides stacking available in both vapor permeable and non-permeable versions of complete weather resistive barrier (WRB) air barrier 2341. The film is lightweight and will not affect loading 2342 of load-bearing surfaces.

The vapor control and fire resistance sheathing system provide shear strength without the need to add additional layers of gypsum to meet fire rating 2343. The proprietary fire-resistant laminate film 2300 cuts and installs just like regular engineered wood 2344. The proprietary fire-resistant laminate film 2300 provides greater durability and impact resistance 2345. The proprietary fire-resistant laminate film 2300 does not affect nailing/stapling schedules or penetration 2346 of one embodiment.

Figure 24:
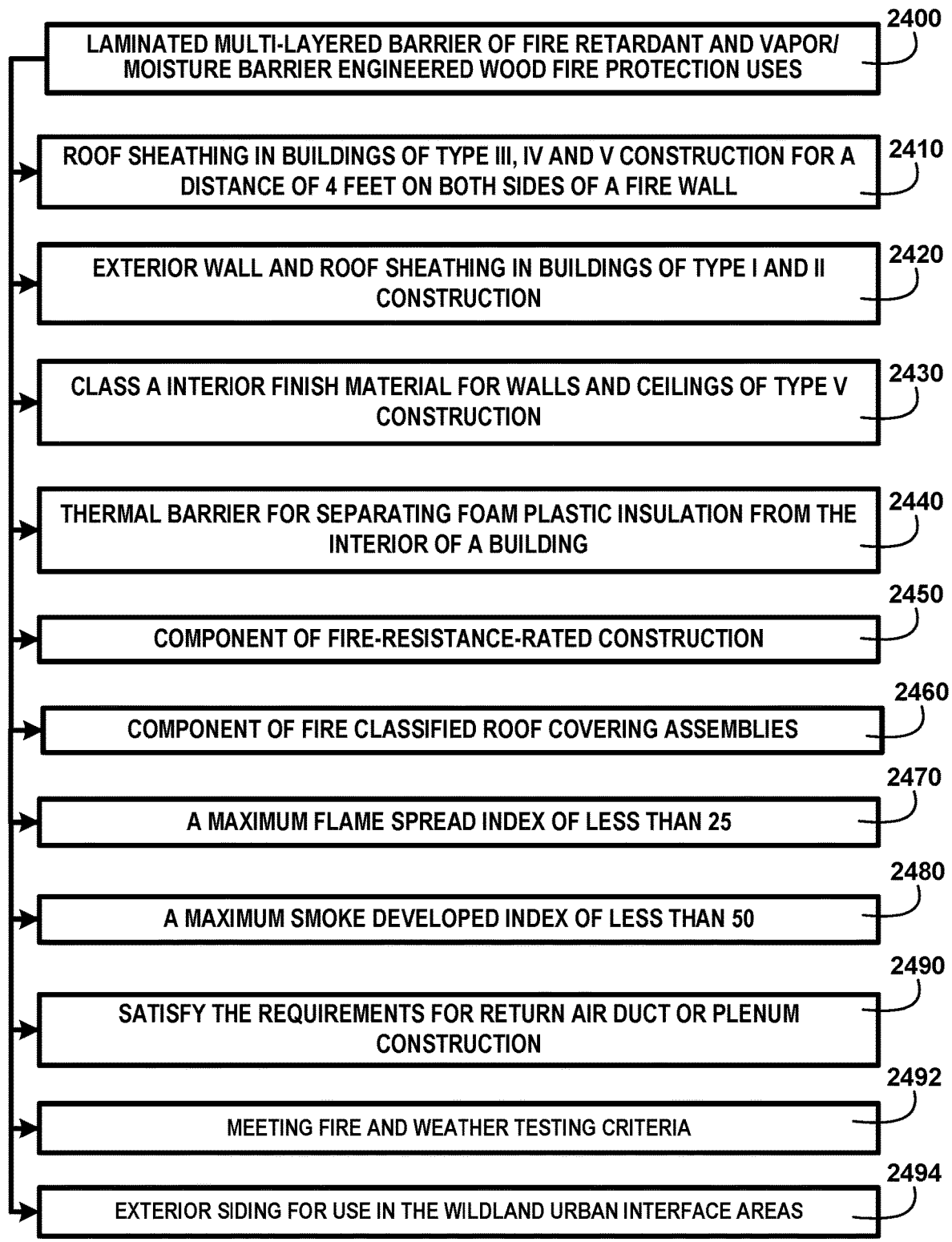
FIG. 24 shows a block diagram of an overview of laminated multi-layered barriers of fire retardant and vapor/moisture barrier engineered wood fire protection uses of one embodiment.

Laminated Multi-Layered Barrier of Fire Retardant and Vapor/Moisture Barrier Engineered Wood Fire Protection Uses:

FIG. 24 shows a block diagram of an overview of laminated multi-layered barriers of fire retardant and vapor/ moisture barrier engineered wood fire protection uses of one embodiment. FIG. 24 shows a laminated multi-layered barrier of fire retardant and vapor/moisture barrier engineered wood fire protection uses 2400. The uses include roof sheathing in buildings of type iii, iv, and v construction for a distance of 4 feet on both sides of a firewall 2410. Another use is for exterior wall and roof sheathing in buildings of type i and ii construction 2420.

The laminated multi-layered barrier is a class A interior finish material for walls and ceilings of type v construction 2430. The laminated multi-layered barrier is used as a thermal barrier for separating foam plastic insulation from the interior of building 2440.

The laminated multi-layered barrier is used as a component of fire-resistance-rated construction 2450 and is used as a component of fire-classified roof covering assemblies 2460. Protection of foamed plastics where the fire-resistant laminate is factory or field applied over the surface of combustible foam plastics to provide the required thermal barrier protection to delay the contribution of the foam in a fire event. In another embodiment, the laminated multi-layered barrier provides a maximum flame spread index of less than 25 2470 and a maximum smoke-developed index of less than 50 2480 to meet fire retardant standards of applicable building codes. The laminated multi-layered barrier will satisfy the requirements for return air duct or plenum construction 2490. The laminated multi-layered barrier will satisfy the requirements for meeting fire and weather testing criteria 2492. The laminated multi-layered barrier is used for applications on exterior siding for use in the wildland-urban interface areas 2494 of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A fire retardant barrier fabrication process, comprising:
   mounting rolls of materials on devices for feeding the materials into the other components;
   rolling out a metalized film of aluminum film/foil for a top surface of the fire retardant barrier;
   integrating intumescent chemicals and compounds into a heat treated aluminized fiberglass cloth forming a structural component;
   applying a heat resistance adhesive to the integrating intumescent chemicals and compounds integrated heat treated aluminized fiberglass cloth;
   adhering the heat treated aluminized fiberglass cloth to the metalized film;
   compressing the adhered coupled materials to form a multi-layered fire retardant barrier product;
   rolling the multi-layered fire retardant barrier product into rolls with specific dimensions for different applications and coupling a plurality of sensors to the metalized film and intumescent chemicals and compounds integrated heat treated aluminized fiberglass cloth for automatically transmitting emergency alarms to fire protection emergency agencies should fire be detected.

2. The fire retardant barrier fabrication process of claim 1, wherein compressing the adhered coupled materials to a thickness range from 0.8 millimeter to 2 millimeter to form a multi-layered fire retardant barrier product.

3. The fire retardant barrier fabrication process of claim 1, further comprising embedding digital electronics and communication devices embedded into the multi-layered fire retardant barrier to power and transmit detected and measured sensor data to a user digital device.

4. The fire retardant barrier fabrication process of claim 1, further comprising measuring the adhered coupled materials to determine a weight of the adhered coupled materials and calculating an average weight.

5. The fire retardant barrier fabrication process of claim 1, wherein the heat treated aluminized fiberglass cloth has an average weight of 610 gram/square meter and a thickness of 0.75 mm.

6. The fire retardant barrier fabrication process of claim 1, wherein the intumescent chemicals and compounds have an average weight of 350 grams per square meter.

7. An apparatus, comprising:
   a first layer of a metalized film;
   a second layer of a heat treated aluminized fiberglass cloth integrated with intumescent chemicals and compounds forming a structural component;
   a heat resistance adhesive configured to adhere the heat treated aluminized fiberglass cloth integrated with intumescent chemicals and compounds to the metalized film;
   wherein the intumescent impregnated fiberglass structural component is configured to adhere to the metalized film made of an aluminum film/foil;
   wherein the adhered first, and second layers are compressed to form a laminated multi-layered barrier;
   wherein the laminated multi-layered barrier is configured in rolls with specific dimensions for different applications and embedding digital electronics and communication devices embedded into the multi-layered fire-retardant barrier to power and transmit detected and measured sensor data to a user digital device.

8. The apparatus of claim 7, wherein compressing the adhered coupled materials to a thickness range from 0.8 millimeter to 2 millimeter to form a multi-layered fire retardant barrier product.

9. The apparatus of claim 7, wherein the metalized film is configured with a thickness range from 7-25 microns thick.

10. The apparatus of claim 7, wherein the metalized film is configured with a service temperature resistance up to 550 Celsius.

11. The apparatus of claim 7, wherein the laminated multi-layered barrier is configured with an average of 1.3 millimeters thick, is dry and no does not contain any wet chemicals.

12. The apparatus of claim 7, wherein the heat treated aluminized fiberglass cloth is configured with a weight of 610 gram/square meter and a thickness of 0.75 mm.

13. The apparatus of claim 7, wherein the intumescent chemicals and compounds are configured with a weight of 350 grams per square meter.

14. An apparatus, comprising:
   a first layer of a metalized film;
   wherein the metalized film is made of an aluminum film/foil;
   a second layer of a heat treated aluminized fiberglass cloth integrated with intumescent chemicals and compounds forming a structural component;
   a heat resistance adhesive configured to adhere the heat treated aluminized fiberglass cloth integrated with intumescent chemicals and compounds to the metalized film;

wherein the adhered first, and second layers are compressed to thickness range from 0.8 millimeter to 2 millimeter to form a laminated multi-layered barrier; and wherein the adhered first, and second layers are compressed to form a laminated multi-layered barrier;

wherein the laminated multi-layered barrier is configured in rolls with specific dimensions for different applications and coupling a plurality of sensors to the metalized film and intumescent chemicals and compounds integrated heat treated aluminized fiberglass cloth for automatically trans mitting emergency alarms to fire protection emergency agencies should fire be detected.

15. The apparatus of claim 14, wherein the intumescent impregnated fiberglass structural component is configured with an expansion rate equal or greater than 35 times by volume.

16. The apparatus of claim 14, wherein the intumescent chemicals and compounds are configured with a weight of 350 grams per square meter.

17. The apparatus of claim 14, wherein the intumescent chemicals and compounds are configured with a thickness of 0.45 mm.

18. The apparatus of claim 14, wherein the laminated multi-layered barrier is configured with an average of 1.3 millimeters thick, is dry and does not contain any wet chemicals.

19. The apparatus of claim 14, wherein the heat treated aluminized fiberglass cloth is configured with a weight of 610 gram/square meter and a thickness of 0.75 mm.

* * * * *